(12) United States Patent  (10) Patent No.: US 7,432,637 B2
Ogawa  (45) Date of Patent: Oct. 7, 2008

(54) PIEZOELECTRIC DRIVE DEVICE AND LIQUID DISCHARGING DEVICE

(75) Inventor: Kenji Ogawa, Musashino (JP)

(73) Assignee: Neuberg Company Limited, Tokyo (JP)

( * ) Notice: Subject to any disclaimer, the term of this patent is extended or adjusted under 35 U.S.C. 154(b) by 0 days.

(21) Appl. No.: 11/757,714

(22) Filed: Jun. 4, 2007

(65) Prior Publication Data

US 2008/0024040 A1      Jan. 31, 2008

(30) Foreign Application Priority Data

Jul. 28, 2006      (JP) .............................. 2006-206711

(51) Int. Cl.
*H01L 41/08* (2006.01)
*F04B 17/00* (2006.01)
(52) U.S. Cl. .................................... 310/328; 417/413.2
(58) Field of Classification Search ................. 310/328; 417/413.1, 413.2
See application file for complete search history.

(56) References Cited

U.S. PATENT DOCUMENTS 5,712,524 A * 1/1998 Suga ........................... 310/328
6,294,859 B1 * 9/2001 Jaenker ....................... 310/328

FOREIGN PATENT DOCUMENTS

JP      2006-029314      2/2006

* cited by examiner

*Primary Examiner*—Thomas M Dougherty
(74) *Attorney, Agent, or Firm*—Rankin, Hill & Clark LLP

(57) ABSTRACT

A piezoelectric drive device 2 includes cases 4 and 5 and a drive device body 6. The drive device body 6 includes a displacement expanding plate 10, a biasing unit 15 and piezoelectric elements 17 and 18. The displacement expanding plate includes a body 110 biased to rotate by the biasing unit 15, and a displacement expanding portion 120 expanding a displacement when the piezoelectric elements 17 and 18 are expanded to be displaced relative to the body in a direction perpendicular to an expanding direction of the piezoelectric elements. In a state where no voltage is applied to the piezoelectric element, a first driven object 31 is moved by the body that is biased by the biasing unit. When a voltage is applied to the piezoelectric element 17, a second driven object 32 is moved by the displacement portion 120. When the voltage is further applied to the piezoelectric element 17 in a state where the second driven object 32 abuts on an object such that the displacement of the displacement expanding portion is expanded, the body 110 and the first driven object 31 are moved against a biasing force of the biasing unit in a direction opposite to a biasing direction of the biasing unit.

6 Claims, 22 Drawing Sheets

PIEZOELECTRIC DRIVE DEVICE AND LIQUID DISCHARGING DEVICE

BACKGROUND OF THE INVENTION

1. Field of the Invention

The present invention relates to a piezoelectric drive device that is driven by a piezoelectric element and a liquid discharging device that uses the piezoelectric drive device.

2. Description of Related Art

A diaphragm pump using a diaphragm or a tube pump using a tube can discharge liquid that contains various fillers without damaging the liquid to be conveyed when the diaphragm or tube is made of a synthetic resin. Such a pump is used in a variety of fields such as chemical, pharmaceutical, semiconductor, or printing industries because advantages that the pump does not require a sealing material and that the pump can realize a structure where the liquid does not contact metals can be obtained.

Such a pump reciprocates a plurality of pressuring rods by turns against the diaphragm or tube to apply a pressure to the diaphragm or tube or to release the pressure therefrom. In this manner, the pump repeats operations of suctioning, measuring and discharging the liquid and discharges the liquid. For the driving of the pressuring rods, an air cylinder type is known, and a cam type rotated by a motor has been also used since the cam can realize a higher-speed driving than the air cylinder (see Document: JP-A-2006-29314).

The cam-driving type can realize a faster reciprocation than the air cylinder, but the cam poses a problem that the pump becomes large because of a difficulty in configuring the cam to be compact. Especially, in a production line for a various products such as LED, the pump is mounted on an arm tip end of a production robot to discharge the liquid while moving. Although there has been a demand for a compact and lightweight pump, the cam-driving type cannot meet the demand.

As described above, a drive device that can reciprocate a driven body such as pressurizing rods at high speed and that can be configured to be compact and lightweight has been conventionally demanded as a drive source for not only the diaphragm pump or tube pump but also a variety of machines.

SUMMARY OF THE INVENTION

An object of the present invention is to provide a drive device that can drive a driven body at high speed and that can be configured to be compact and lightweight, and a liquid discharging device using the drive device.

A drive device according to an aspect of the present invention is a drive device that includes a case; and a drive unit body movable relative to the case, wherein the drive unit body includes: a displacement expanding plate; a biasing unit; and a piezoelectric element attached to the displacement expanding plate, the displacement expanding plate includes: a body adapted to rotate or slide relative to the case, the body biased by the biasing unit; and a displacement expanding portion expanding a displacement when the piezoelectric element is expanded due to a voltage application, the displacement expanding portion being displaced relative to the body in a direction perpendicular to an expanding direction of the piezoelectric element, in a state where no voltage is applied to the piezoelectric element, a first driven object is moved by the body that is biased by the biasing unit, when the voltage is applied to the piezoelectric element, a second driven object is moved by the displacement expanding portion, and when the voltage is further applied to the piezoelectric element in a state where the second driven object abuts on an object such that the displacement of the displacement expanding portion is expanded, the body and the first driven object are moved against a biasing force of the biasing unit in a direction opposite to a biasing direction of the biasing unit.

According to this aspect of the present invention, the driven object is driven by use of a piezoelectric element, so that the drive device can be made as compact and lightweight as a drive device employing the air cylinder. Thus, the device can be downsized more easily than drive devices using a servomotor, solenoid and cam.

In addition, the first driven object moved by the body is adapted to reciprocate owing to the biasing unit biasing the body and the piezoelectric element displacing the displacement expanding portion to move the second driven object. Accordingly, when two driven objects are to be moved, it may be only necessary to provide one piezoelectric element and one displacement expanding portion in addition to the body. With this arrangement, the number of piezoelectric elements can be reduced compared with a case where the piezoelectric element is provided to each of the driven bodies. In this respect as well, the drive device can be configured to be compact, thereby reducing cost.

Further, since the piezoelectric element is adapted to drive at high speed, the drive device can drive the driven object faster than the drive device using the air cylinder.

The piezoelectric element produces more generative force than the air cylinder, such that the driven object can be reliably driven.

Additionally, displacement amount of the piezoelectric element can be easily controlled with voltage level applied thereto, thus movement amount of the driven body can be also accurately and easily controlled.

Since the driven body is moved via the displacement expanding portion, even when an expanded amount of the piezoelectric element is small, the displacement amount of the displacement expanding portion can be made large, so that the movement amount of the driven body can be made much larger than the displacement amount of the piezoelectric element.

In the piezoelectric drive device according to the aspect of the present invention, it is preferable that the piezoelectric element includes a first piezoelectric element and a second piezoelectric element, the displacement expanding plate includes: a first displacement expanding portion being displaced relative to the body in a direction perpendicular to an expanding direction of the first piezoelectric element in accordance with the expansion of the first piezoelectric element; and a second displacement expanding portion being displaced relative to the body in a direction perpendicular to an expanding direction of the second piezoelectric element in accordance with the expansion of the second piezoelectric element, the body moves a first driven object, the first displacement expanding portion moves a second driven object, and the second displacement expanding portion moves a third driven object.

According to this aspect of the present invention, the first and second piezoelectric elements (i.e., two piezoelectric elements) and the first and second displacement expanding portions (i.e., two displacement expanding portions) are provided in addition to the body, so that the first to third driven bodies (i.e., three driven bodies) can be moved. Accordingly, the drive device can perform a more complex operation than a drive device driving two driven bodies.

In the piezoelectric drive device according to the aspect of the present invention, it is preferable that the body having a base end portion and an arm extended from the base end portion is substantially L-shaped in plane view, the displacement expanding plate includes: a first hinge and a second hinge continuously formed from the base end portion of the body, the first and second hinges being arranged to be parallel with each other; a piezoelectric-element-first-end mounting portion continuously formed from the first hinge, the piezoelectric-element-first-end mounting portion being mounted with a first end of the piezoelectric element; a displacement portion continuously formed form the second hinge, the displacement portion extending along a longitudinal direction of the piezoelectric element to a second end side of the piezoelectric element; a third hinge formed from the displacement portion toward the second end of the piezoelectric element; and a piezoelectric-element-second-end mounting portion continuously formed from the third hinge, the piezoelectric-element-second-end mounting portion being mounted with the second end of the piezoelectric element, and the arm, the piezoelectric element and the displacement portion are arranged to be substantially parallel with one another.

According to this aspect of the present invention, the displacement expanding plate is integrally formed, so that the displacement amount of the driving unit corresponding to the expanded and contracted amount of the piezoelectric element can be accurately set.

Specifically, since the expanded amount of the piezoelectric element is extremely small, when a pin or cam is present in a displacement transmission path, backlash of a part where the pin or cam is placed may absorb the displacement. In contrast, in the present invention, the displacement expanding plate is integrally formed in a wire-cut method, so that the device can reliably displace the displacement expanding plate by a predetermined amount in correspondence with the expansion of the piezoelectric element, while preventing the displacement from being absorbed.

A liquid discharging device according to another aspect of the present invention is a liquid discharging device that includes a piezoelectric drive device; a first pressing member as a first driven object to be moved by a body of the piezoelectric drive device; a second pressing member as a second driven object to be moved by a displacement expanding portion of the piezoelectric drive device; and a tube pressurized by the first pressing member and the second pressing member, wherein the piezoelectric drive device includes: a case; and a drive unit body movable relative to the case, the drive unit body includes: a displacement expanding plate; a biasing unit; and a piezoelectric element attached to the displacement expanding plate, the displacement expanding plate includes: a body adapted to rotate or slide relative to the case, the body biased by the biasing unit; and a displacement expanding portion expanding a displacement when the piezoelectric element is expanded due to a voltage application, the displacement expanding portion being displaced relative to the body in a direction perpendicular to a direction in which the piezoelectric element is expanded, in a state no voltage is applied to the piezoelectric element, a first driven object is moved by the body that is biased by the biasing unit, when the voltage is applied to the piezoelectric element, a second driven object is moved by the displacement expanding portion, and when the voltage is further applied to the piezoelectric element in a state where the second driven object abuts on an object such that the displacement of the displacement expanding portion is expanded, the body and the first driven object are moved against a biasing force of the biasing unit in a direction opposite to a biasing direction of the biasing unit.

According to this aspect of the present invention, when no voltage is applied to the piezoelectric element, the first pressing member as the first driven object is clamped against the tube so that the tube is blocked, while the second pressing member as the second driven object remains not blocking the tube. When a voltage is applied to the piezoelectric element, the second pressing member is moved to be clamped against the tube. When a further voltage is applied thereto, the second pressing member, which is already clamped against the tube and not movable any further, produces a reaction force, so that the body and the first pressing member can be moved in a direction away from the tube.

Accordingly, when either of the first or second pressing member is employed as an outlet valve of the liquid discharging device while the other as an inlet valve of the liquid discharging device, a liquid discharging operation can be realized by pumping the liquid into the tube and switching the opening and closing of the respective valves. For instance, when the first pressing member is employed as the outlet valve while the second pressing member as the inlet valve, in a state where no voltage is applied to the piezoelectric element, the first pressing member is clamped against the tube due to a biasing force of the biasing unit, so that the outlet valve is maintained in a closed state. On the other hand, the second pressing member maintains the inlet valve in an opened state. When the liquid is pumped into the tube in this state, the outlet valve is then swollen at an upstream side (inlet valve side) due to the closure of the outlet valve, so that the liquid is pooled therein. Then, when the voltage is applied to the piezoelectric element for the expansion, such that the second pressing member is moved and clamped against the tube for the closure of the inlet valve, the liquid is then enclosed inside the swollen portion of the tube between the inlet and outlet valves. Further, when the further voltage is applied so that the piezoelectric element is expanded, since the second pressing member, which is already clamped against the tube, is not movable any further, the body and the first pressing member is moved against the biasing force of the biasing unit in a direction opposite to the biasing direction. The outlet valve that has been closed by the first pressing member then opens. At this moment, the tube swollen by the liquid is restored to the original state by its elastic force and the liquid inside is discharged from the discharge valve.

Next, when the application of the voltage to the piezoelectric element is suspended so that the piezoelectric element is contracted to the original state, the first pressing member is clamped against the tube due to the biasing force of the biasing unit and the outlet valve is closed. Then, the second pressing member returns to the original position, thereby releasing the tube and opening the inlet valve.

As described above, undergoing from the state where only one pressing member closes the tube via the state where both the pressing members close the tube to the state where only the other pressing member closes the tube, the liquid discharging device can discharge even a slight amount of the liquid when equipped with a capability to pump the liquid.

In addition, since the piezoelectric drive device using the piezoelectric element drives each of the pressing members, a compact and thinned liquid discharging device capable of driving at high speed can be easily realized.

The liquid discharging device according to a further aspect of the present invention is a liquid discharging device that includes a piezoelectric drive device; a first pressing member as a first driven object to be moved by a body of the piezoelectric drive device; a second pressing member as a second driven object to be moved by a first displacement expanding portion of the piezoelectric drive device; a third pressing member as a third driven object to be moved by a second displacement expanding portion of the piezoelectric drive device; and a tube or a diaphragm pressurized by the first pressing member, the second pressing member and the third pressing member, wherein the piezoelectric drive device includes: a case; and a drive unit body movable relative to the case, the drive unit body includes: a displacement expanding plate; a biasing unit; and a piezoelectric element attached to the displacement expanding plate, the displacement expanding plate includes: the body adapted to rotate or slide relative to the case, the body biased by the biasing unit; and a displacement expanding portion expanding a displacement when the piezoelectric element is expanded due to a voltage application, the displacement expanding portion being displaced relative to the body in a direction perpendicular to a direction in which the piezoelectric element is expanded, in a state no voltage is applied to the piezoelectric element, the first driven object is moved by the body that is biased by the biasing unit, when the voltage is applied to the piezoelectric element, the second driven object is moved by the displacement expanding portion, when the voltage is further applied to the piezoelectric element in a state where the second driven object abuts on an object such that the displacement of the displacement expanding portion is expanded, the body and the first driven object are moved against a biasing force of the biasing unit in a direction opposite to a biasing direction of the biasing unit, the piezoelectric element includes a first piezoelectric element and a second piezoelectric element, the displacement expanding plate includes: the first displacement expanding portion being displaced relative to the body in a direction perpendicular to an expanding direction of the first piezoelectric element in accordance with the expansion of the first piezoelectric element; and the second displacement expanding portion being displaced relative to the body in a direction perpendicular to an expanding direction of the second piezoelectric element in accordance with the expansion of the second piezoelectric element, the body moves the first driven object, the first displacement expanding portion moves the second driven object, and the second displacement expanding portion moves the third driven object.

According to this aspect of the present invention, the liquid discharging device can be provided with the third pressing member that is moved by a movement of the second piezoelectric element and the second displacement expanding portion in addition to the first pressing member moved by the body and the second pressing member moved by the movement of the first piezoelectric element and the first displacement expanding portion.

Accordingly, when either of the first and second pressing members is employed as the outlet valve whose opening and closing is controlled by the pressurization of the tube or diaphragm while the other as the inlet valve, the third pressing member may be employed as a measurement member that changes the measurement space enclosed by each of the valves by pressurizing the tube and diaphragm between the inlet and outlet valves. With this arrangement, the liquid can be suctioned by opening the inlet valve in a state that the outlet valve is closed and by enlarging the measurement space with the measurement member. Then, when the inlet valve is closed, the liquid is enclosed within the measurement space that is comparted between each of the valves. Next, when the outlet is opened such that the measurement member presses the tube and the diaphragm to narrow the measurement space, a liquid discharging operation can be realized due to the discharge of the changed portion of the liquid from the outlet valve.

In addition, since the suction and discharge of the liquid is performed by changing the volume of the measurement space using the third pressing member, there is no need to pressurize the liquid for supply. Thus, the liquid discharging device can be used as the tube pump or diaphragm pump.

In addition, since the piezoelectric drive device using the piezoelectric element drives each of the first to third pressing members, a compact liquid discharging device capable of driving at high speed can be easily realized. With this arrangement, the liquid discharging device itself can be also thinned owing to thinning of the piezoelectric element and the displacement expanding plate. Thus, when arraying a plurality of the liquid discharging devices in a production line, the space between the liquid discharging devices can be narrowed.

DETAILED DESCRIPTION OF PREFERRED EMBODIMENT(S)

First Embodiment

A first embodiment of the present invention will be described below with reference to the attached drawings.

Figure 1:
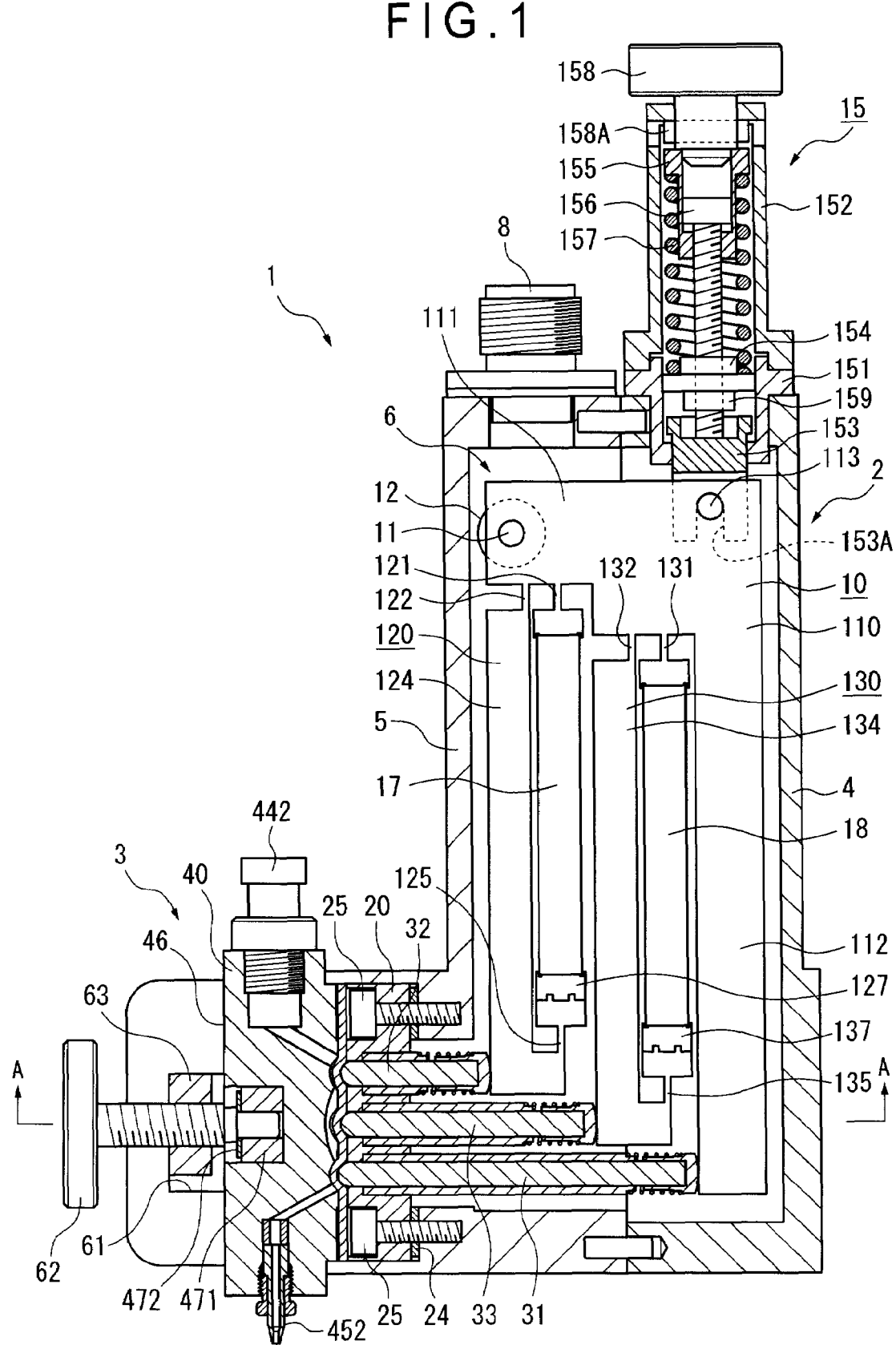
FIG. 1 is a vertical cross-sectional view showing a liquid discharging device according to a first embodiment of the present invention.

FIG. 1 illustrates a liquid discharging device 1 according to the present embodiment. Note that although the upper side and the lower side of FIG. 1 are respectively referred to as an upper side and lower side of the device 1 for a convenience in the explanation below, the orientation of the liquid discharging device 1 in use is not limited to that in FIG. 1, and the liquid discharging device 1 may be used facing in a horizontal direction or be used with the upper side down.

The liquid discharging device 1 is a diaphragm pump that includes a piezoelectric drive device 2 for the liquid discharging device 1 and a pump section 3.

[Arrangement of Piezoelectric Drive Device]

The piezoelectric drive device 2 includes a driving unit case 4, a pump case 5 screwed to the driving unit case 4 and a drive device body 6.

The drive device body 6 includes a displacement expanding plate 10 housed in the cases 4 and 5, a biasing unit 15 and a first piezoelectric element 17 and a second piezoelectric element 18 that are attached to the displacement expanding plate 10.

[Arrangement of Displacement Expanding Plate]

The displacement expanding plate 10 is formed from a bending-deformable (elastically deformable) thin sheet material such as maraging steel, stainless, or inver material. The plate 10 is manufactured by cutting one sheet of the sheet material in a method like wire-cutting into a predetermined shape as described below.

Figure 2:
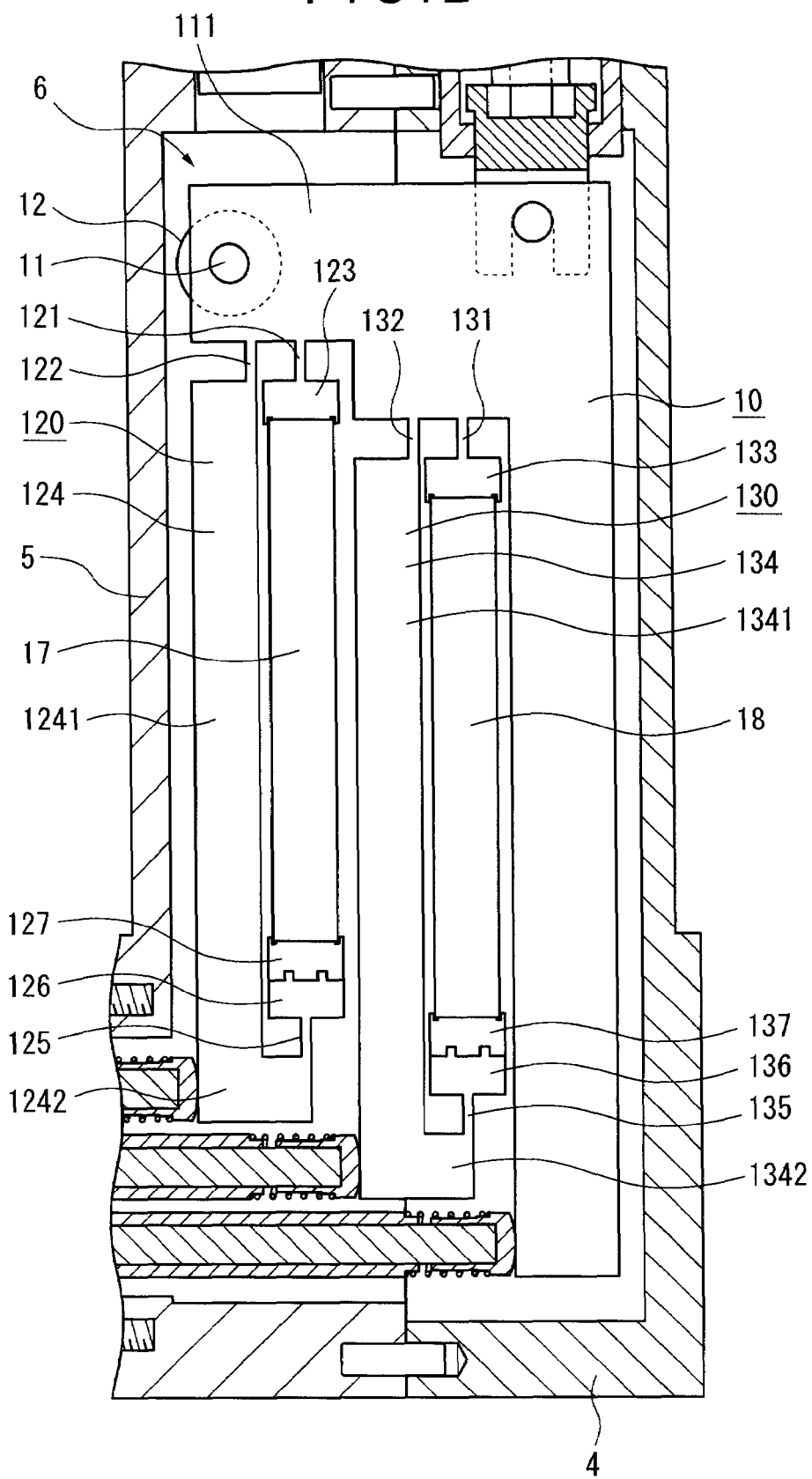
FIG. 2 is an enlarged view showing a piezoelectric drive device according to the first embodiment.
Figure 3:
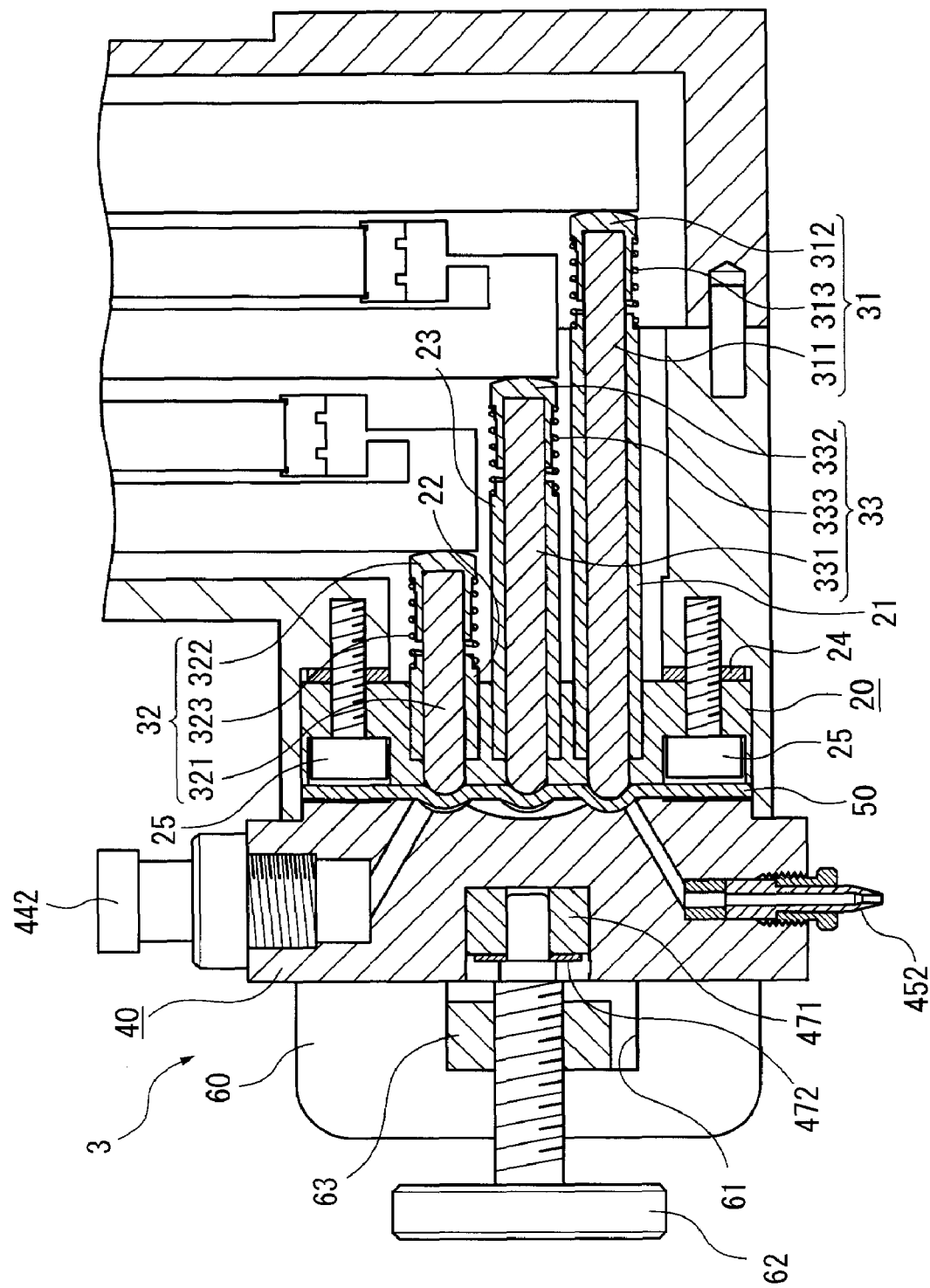
FIG. 3 is an enlarged view showing a pump section according to the first embodiment.
Figure 4:
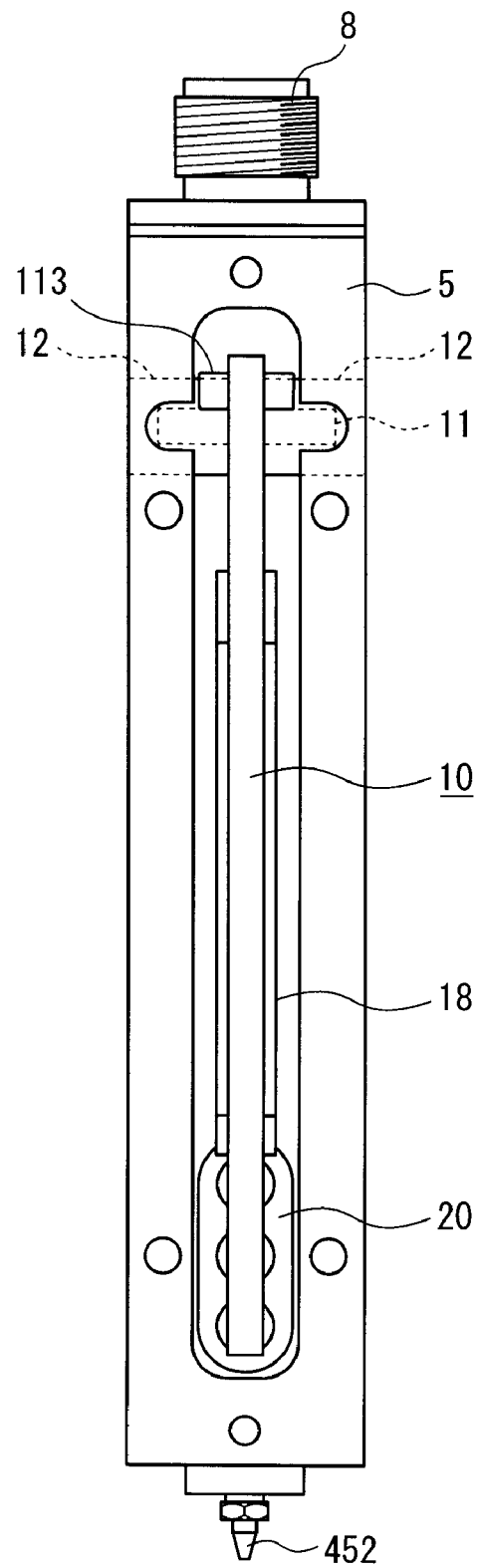
FIG. 4 is a side view showing a pump case and a displacement expanding plate seen from a driving unit case side according to the first embodiment.
Figure 5:
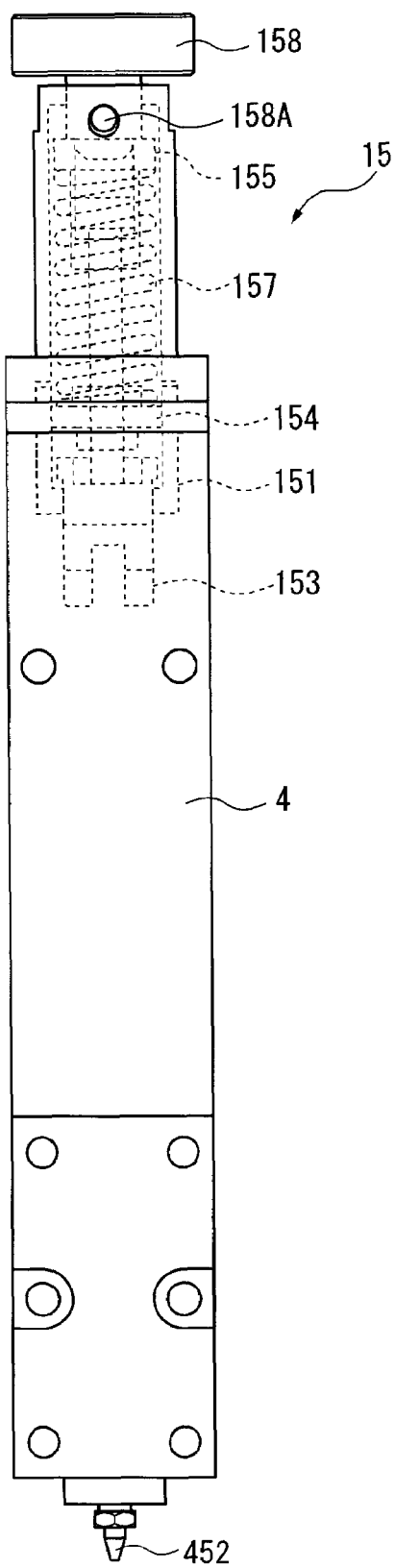
FIG. 5 is a side view showing the liquid discharging device on a driving unit case side according to the first embodiment.

In addition, as shown in FIG. 2, a shaft 11 provided on the displacement expanding plate 10 is supported by a shaft bearing 12 mounted on the pump case 5, and the displacement expanding plate 10 is arranged to be rotatable relative to the cases 4, 5. Note that the shaft bearing 12 is mounted on the pump case 5 with a stop ring (not shown) so that the bearing does not drop off therefrom.

The displacement expanding plate 10 includes a body 110, a first displacement expanding portion 120 and a second displacement expanding portion 130.

The body 110 has a base end portion 111 provided on an upper side of the displacement expanding plate 10 and an arm 112 extending downwardly from one end side of the base end portion 111 (a driving unit case 4 side), and the body 110 has a substantially L-shape in plan view. On the other end side of the base end portion 111 (a pump case 5 side), the shaft 11 is provided.

The first displacement expanding portion 120 includes a first hinge 121, a second hinge 122, a piezoelectric-element-first-end mounting portion 123, a displacement portion 124, a third hinge 125 and a piezoelectric-element-second-end mounting portion 126.

The first hinge 121 and the second hinge 122 are formed to protrude downwardly from a lower surface of the base end portion 111 and arranged to be parallel with each other.

The piezoelectric-element-first-end mounting portion 123 is continuously provided from the first hinge 121. The piezoelectric-element-first-end mounting portion 123 is mounted with a first end portion (upper end) in an axial direction of the piezoelectric element 17.

The displacement portion 124 is continuously provided to the second hinge 122 and extends along the longitudinal direction (vertical direction) of the first piezoelectric element 17 to a second end (lower end) side of the first piezoelectric element 17. Specifically, the displacement portion 124 has an extension 1241 extending downwardly from the second hinge 122 and a connecting portion 1242 horizontally extending (on a first piezoelectric element 17 side) at a position lower than the second end of the piezoelectric element 17. The displacement portion 124 has a substantially L-shape in plan view, as shown in FIG. 1.

The third hinge 125 protrudes from the connecting portion 1242 of the displacement portion 124 toward the second end of the first piezoelectric element 17.

The piezoelectric-element-second-end mounting portion 126 is continuously provided from the third hinge 125 and the second end side of the first piezoelectric element 17 is mounted thereto.

Note that a spacer 127 is interposed between the mounting portion 126 and the first piezoelectric element 17. In addition, each of the hinges 121, 122, 125 is a narrow portion having a smaller width-dimension than the other portions such as the displacement portion 124. Thus, the hinges are elastically deformed when applied with a stress.

The second displacement expanding portion 130 has the same arrangement with the first displacement expanding portion 120, except that the second displacement expanding portion 130 is provided at a position one-step lower than the first displacement expanding portion 120.

Specifically, the second displacement expanding portion 130 has a first hinge 131, a second hinge 132, a piezoelectric-element-first-end mounting portion 133, a displacement portion 134, a third hinge 135 and a piezoelectric-element-second-end mounting portion 136, whose arrangements each are respectively the same with that of the first hinge 121, the second hinge 122, the piezoelectric-element-first-end mounting portion 123, the displacement portion 124, the third hinge 125 and the piezoelectric-element-second-end mounting portion 126 of the first displacement expanding portion 120. Accordingly, the displacement portion 134 also has an extension 1341 and a connecting portion 1342, and the portion 134 has a substantially L-shape in plane view.

Similarly inn the second displacement expanding portion 130, the first end of the second piezoelectric element 18 is mounted to the piezoelectric-element-first-end mounting portion 133 while the second end of the second piezoelectric element 18 is mounted to the piezoelectric-element-second-end mounting portion 136 via the spacer 137.

Accordingly, the arm 112 of the body 110, the displacement portion 124 of the first displacement expanding portion 120 (the extension 1241), the displacement portion 134 of the displacement expanding portion 130 (the extension 1341), the first piezoelectric element 17, and the second piezoelectric element 18 are respectively arranged along the vertical direction to be substantially parallel with one another.

Note that the top end of the pump case 5 is provided with a connector 8 to be connected with a control device (not shown) that controls the driving of the piezoelectric elements 17, 18.

[Arrangement of Biasing Unit]

As shown in FIG. 1, the biasing unit 15 has a lower spring case 151, an upper spring case 152, a connecting member 153, a screw spring washer 154, an adjusting spring washer 155, a space adjustment screw 156, a coil spring 157 and a spring pressing member 158.

The lower spring case 151 and the upper spring case 152 are mounted to the case 4 with the upper spring case 152 screwed by fixing screws to the driving unit case 4 via the lower case 151.

The connecting member 153 is adapted to slide in the vertical direction inside the lower spring case 151. Then, an engaging groove 153A is provided to the connecting member 153, and the engaging groove 153A is engaged with a pin 113 arranged on the base end portion 111 of the displacement expanding plate 10.

The coil spring 157 is arranged between the screw spring washer 154 and the adjusting spring washer 155. In addition, an adjustment of the space between the screw spring washer 154 and the adjusting spring washer 155 is performed by adjusting a height position of the screw spring washer 154 using a nut 159 provided on the lower side of the screw spring washer 154 and the space adjustment screw 156 screwed to the nut 159. A lower end of the space adjusting screw 156 abuts on the connecter 153.

In addition, the spring pressing member 158 is mounted with a parallel pin 158A. On the other hand, the upper spring case 152 has a groove into which the parallel pin 158A is inserted, and the groove is formed continuously from an upper end of the upper spring case 152. Accordingly, the spring pressing member 158 is inserted from the upper side of the upper spring case 152 while the parallel pin 158A is inserted into the groove. Then the spring pressing member 158 is rotated 90 degrees, so that the parallel pin 158A is engaged with an upper flange of the upper spring case 152. In this manner, the spring pressing member 158 is attached to the upper spring case 152.

Thus, when the spring pressing member 158 is rotated 90 degrees from the state shown in FIG. 1 for a detachment from the upper spring case 152, the adjusting spring washer 155 becomes movable in the upper direction to increase the space between each of the spring washers 154 and 155. Consequently, the biasing force applied to the body 110 is released by the coil spring 157.

On the other hand, when the spring pressing member 158 is attached to the upper spring case 152 as shown in FIG. 1, the space between the spring washers 154, 155 is reduced, so that the coil spring 157 applies to the body 110 via the connecting member 153 the biasing force corresponding to the space.

When the space adjusting screw 156 is rotated to move the screw spring washer 154 in the vertical direction, the movement of the washer 154 adjusts the space between the spring washers 154 and 155 in the state where the spring pressing member 158 is attached. By adjusting the space between the washers, the biasing force then applied is adjusted.

The biasing unit 15 that has the above-described arrangement biases the displacement expanding plate 10 so that the plate 10 is rotated around the shaft 11 in the clockwise direction in FIG. 1.

[Arrangement of Pump Section]

Meanwhile, the pump case 5 is provided with the pump section 3 driven by the piezoelectric drive device 2. The pump case 5 has an opening communicating with the outside of the case 5, into which a guide block 20 is inserted. The guide block 20 has three penetrating holes that are respectively provided with a tubular guide member 21, 22, 23.

In addition, the guide block 20 is fixed to the pump case 5 via height adjusting shims 24 by a screw 25 that is screwed into the guide block 20.

The guide members 21, 22, 23 have a first to third pressing member 31, 32, 33 inserted therein respectively.

The pressing members 31, 32, 33 each includes a pressurizing rod 311, 321, 331 and a rod receiver 312, 322, 332 respectively. The rod receivers 312, 322, 332 are attached to ends of the respective pressurizing rods 311, 321, 331.

Return springs 313, 323, 333 are interposed between the guide members 21, 22, 23 and the rod receivers 312, 322, 332 respectively.

The first pressing member 31 is biased by the return spring 313 to abut on a lower end of a side surface of the arm 112 of the body 110 of the displacement expanding plate 10. Accordingly, the first pressing member 31 advances and retreats in conjunction with the rotation of the arm 112 (i.e., the body 110).

The second pressing member 32 is biased by the return spring 323 to abut on a lower end of a side surface of the displacement portion 124 of the first displacement expanding portion 120 of the displacement expanding plate 10. Accordingly, the second pressing member 32 advances and retracts in conjunction with the expansion of the displacement portion 124 (i.e., the first displacement expanding portion 120).

Likewise, the third pressing member 33 is biased by the return spring 333 to abut on a lower end of a side surface of the displacement portion 134 of the second displacement expanding portion 130 of the displacement expanding plate 10. Accordingly, the third pressing member 33 advances and retreats in conjunction with the expansion of the displacement portion 134 (i.e., the second displacement expanding portion 130).

Note that spring force of the coil spring of the biasing unit 15 is set to be greater than total spring force of the return springs 313, 323, 333, so that the return springs 313, 323, 333 do not affect the biasing operation of the biasing unit 15.

Further note that although a lower end of the arm 112 rotates around the shaft 11 of the displacement expanding plate 10, the lower end of the arm 112 can be considered to move in a substantially horizontal direction due to the slight rotation angle and the remote distance from the shaft 11. In addition, an end of the rod receiver 312 abutting on the arm 112 is arranged to have a curved surface so that the end point-contacts the arm 112.

Accordingly, even when the lower end of the arm 112 indicates a movement locus of a circular arc, the first pressing member 31 horizontally and linearly moves along the guide member 21.

Likewise, lower ends of the displacement portions 123, 134 rotate around the second hinges 122, 132 indicating a circular arc line. However, the lower ends of the displacement portions 124, 134 can be considered to move in a substantially horizontal direction (a direction perpendicular to a vertical direction in which the piezoelectric elements 17, 18 are expanded and contracted) due to the slight rotation angle and the remote distance from the second hinges 122, 132. In addition, ends of the rod receiver 322, 332 abutting on the displacement portions 124, 134 are arranged to have curved surfaces so that the ends point-contact the displacement portions 124, 134.

Accordingly, even when the lower ends of the displacement portions 124, 134 indicate a movement locus of a circular arc, the second and third pressing members 32, 33 horizontally and linearly move along the guide members 22, 23.

The pump case 5 is mounted with a channel block 40. A diaphragm 50 is interposed between the channel block 40 and the guide block 20.

Figure 6A:
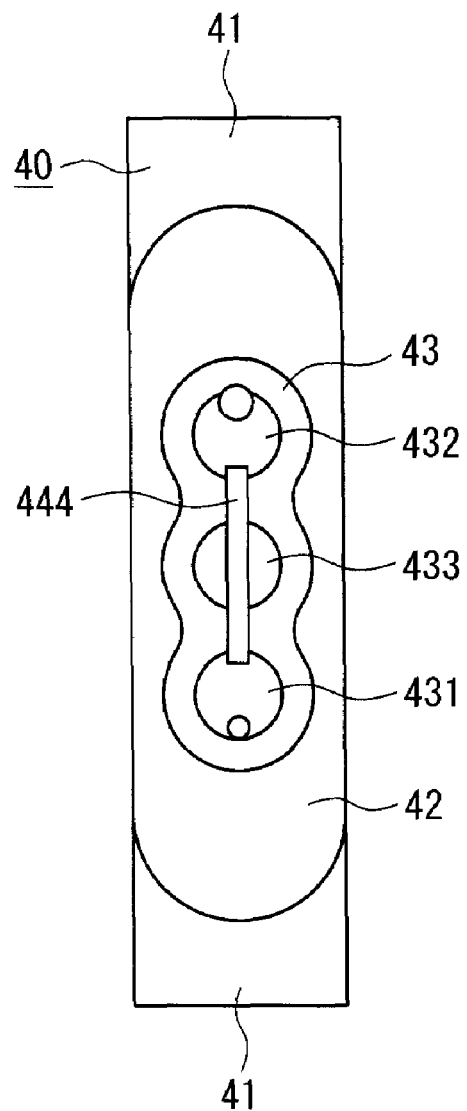
FIG. 6A is a front view showing a channel block according the first embodiment.
Figure 6B:
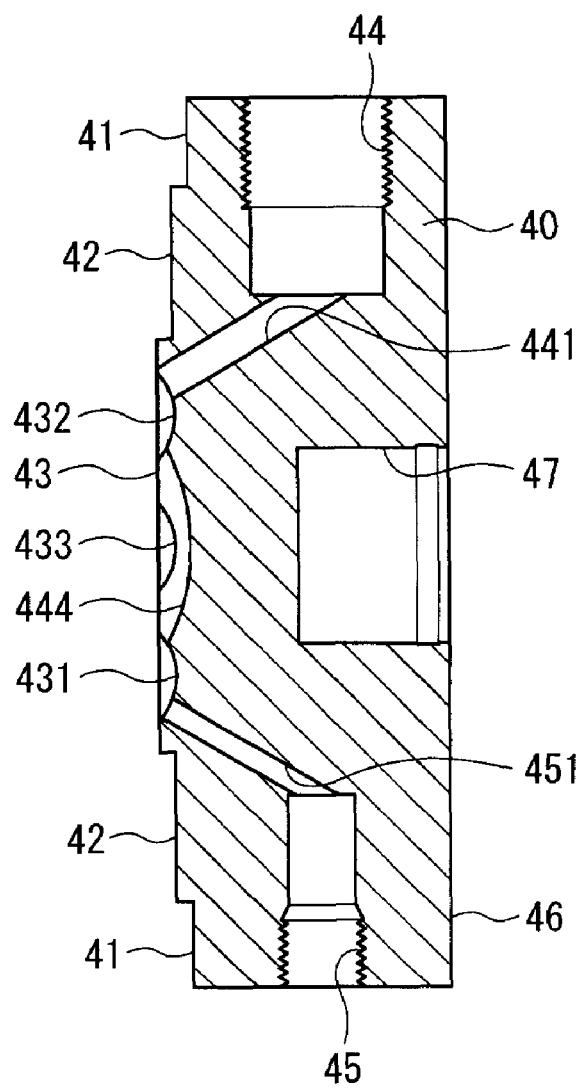
FIG. 6B is a cross-sectional view showing the channel block according the first embodiment.

As shown in FIGS. 6A and 6B, the channel block 40 is formed in a shape of a substantial rectangular parallelepiped. Case abutting surfaces 41, case insertion surfaces 42 and a concave formation surface 43 are provided with a surface of the channel block 40, the surface facing the guide block 20. The case insertion surfaces 42 protrude from the case abutting surfaces 41 while the concave formation surface 43 protrudes from the case insertion surfaces 42.

The concave formation surface 43 is provided with three concave portions 431 to 433 that are aligned in a vertical direction. Further, a groove 444 is formed to be communicated with the concave portions 431 to 433 Note that in the present embodiment, the groove 444 is formed by milling, such that the groove 444 has a bottom surface that is deeper than that of the central concave portion 433.

In addition, the concave portion 432 is provided with a suction channel 441 communicating with a liquid suction port 44 and the liquid suction port 44 is formed on a top end surface of the channel block 40. On the other hand, the concave portion 431 is provided with a discharge channel 451 communicating with a liquid discharge port 45, and the liquid discharge port 45 is formed on a bottom end surface of the channel block 40.

Note that in the present embodiment, as shown in FIG. 1, the liquid suction port 44 is mounted with a syringe holder 442 to which a syringe containing liquid is attached while the liquid discharge port 45 is mounted with a nozzle 452 for discharging liquid.

Further, an outer peripheral surface 46 of the channel block 40 opposite to the surfaces 41 to 43 is provided with a concave portion 47. As shown in FIG. 1, a pressing bush 471 and a washer 472 are arranged in the concave portion 47 and fixed therein by a stopping ring (not shown).

Figure 7:
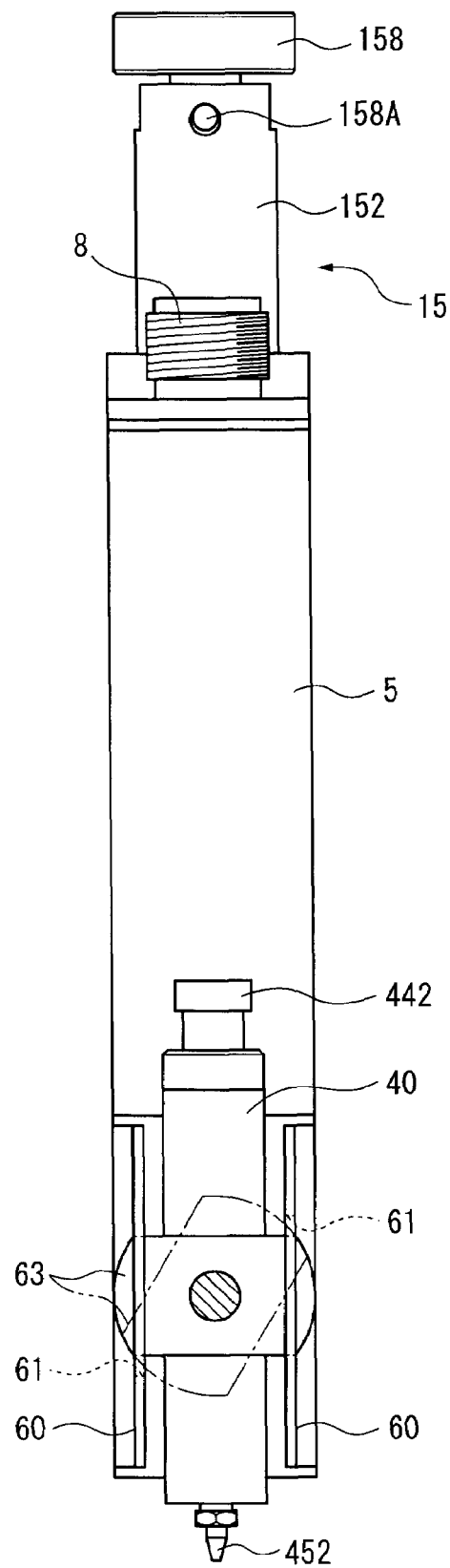
FIG. 7 is a side view showing the liquid discharging device on a pump case side according to the first embodiment.
Figure 8:
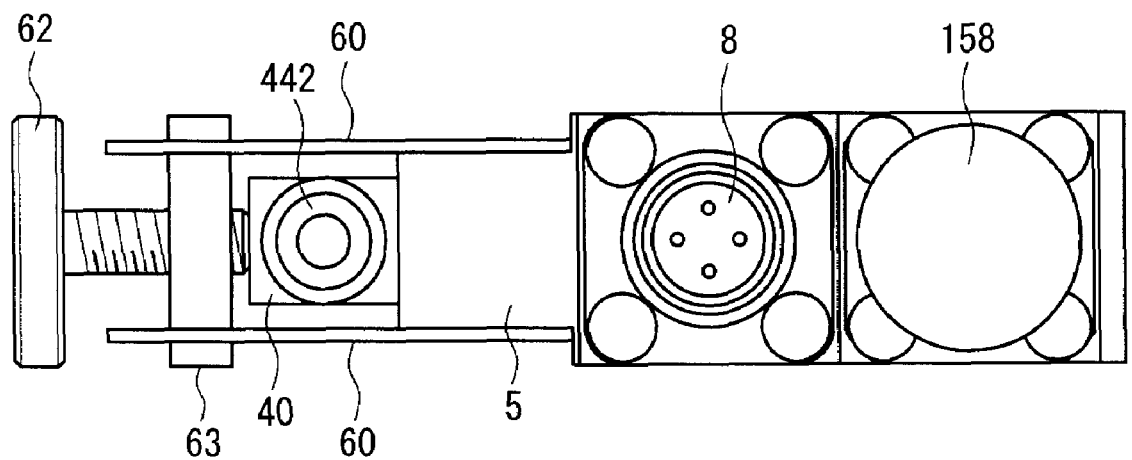
FIG. 8 is a top view showing the liquid discharging device according to the first embodiment.
Figure 9:
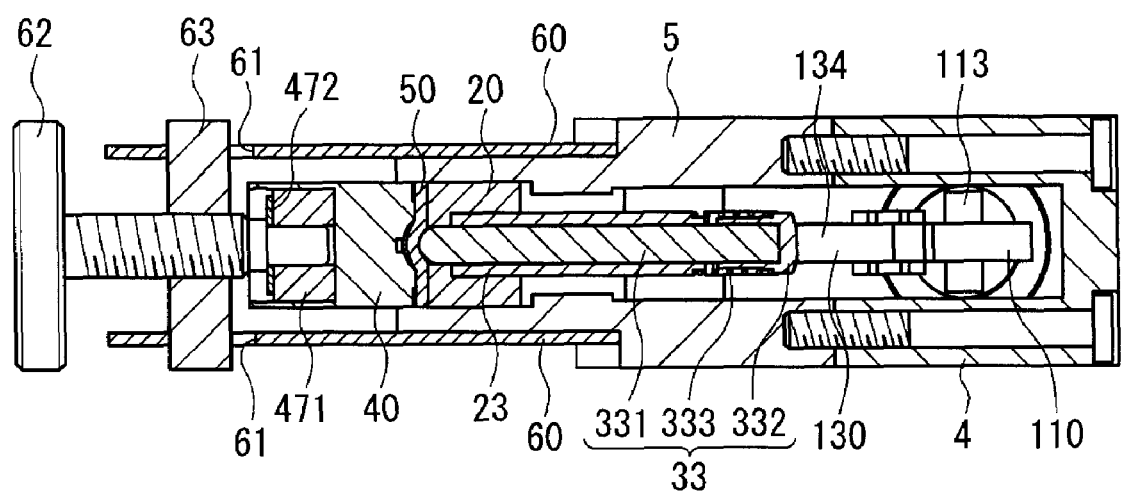
FIG. 9 is a cross-section taken along A-A line in FIG. 1.

As shown in FIGS. 7 to 9, a pair of side plates 60 are arranged and fixed so as to face each other in the pump case 5. The channel block 40 is provided between the side plates 60. The side plates 60 each have an opening 61.

The openings 61 are arranged with a stay 63 screwed to a block mounting screw 62. The stay 63 has substantially rectangle-shape in plan view, narrow sides of the stay 63 are respectively shaped in a circular arc. The openings 61 of the side plates 60 each is formed to be deviated from each other in a vertical direction such that the stay 63 can be detached from the openings 61 when the block mounting screw 62 is rotated.

An tip end of the block mounting screw 62 is adapted to intrude into a hole formed on the pressing bush 471.

Accordingly, in a state where the case insertion surface 42 of the channel block 40 is inserted into the opening of the pump case 5, the tip end of the block mounting screw 62 is intruded into the hole of the pressing bush 471 and the block mounting screw 62 is rotated so that the stay 63 is arranged within the openings 61 of the side plates 60. In this manner, the channel block 40 is attached to the pump case 5.

Conversely, when the block mounting screw 62 is rotated so that the stay 63 is out of the openings 61 of the side plates 60 and the block mounting screw 62 is pulled to be detached from the space the side plates 60, the channel block 40 is easily detached from the pump case 5.

The diaphragm 50 is formed of an elastically deformable rubber (synthetic rubber and natural rubber) or the like and has the same planer shape as the case insertion surface 42. The diaphragm 50 is held between the guide block 20 and the channel block 40.

Particularly, since the space between the concave formation surface 43 protruding from the case insertion surface 42 and the guide block 20 is the narrowest, the diaphragm 50 is pressed to closely fit to the concave formation surface 43.

Accordingly, the space between the guide block 20 and the concave formation surface 43 can be adjusted by changing the thickness dimension of the height adjusting shim 24, and the fitting force of the diaphragm 50 to the concave formation surface 43 can be easily set.

In addition, the tip ends of the pressurizing rods 311, 321, 331 each are sphere-shaped so that the tips fit to the concave portions 431 to 433. When the pressurizing rods 311, 321, 331 are moved to the channel block side for pressurizing the diaphragm 50, the diaphragm 50 closely fits to inner surfaces of the concave portions 431 to 433.

Specifically, when the diaphragm 50 is pressurized by the pressurizing rod 311, the diaphragm 50 closely fits to the concave portion 431, so that the communication between the discharge channel 451 and the groove 444 is blocked. Thus, the outlet valve is closed.

In addition, when the diaphragm 50 is pressurized by the pressurizing rod 321, the diaphragm 50 closely fits to the concave portion 432, so that the communication between the suction channel 441 and the groove 444 is blocked. Thus, the inlet valve is closed.

Since the diaphragm 50 is elastically deformed due to the pressure applied by the pressurizing rods 311, 321, 331, when the pressure is released, the diaphragm 50 returns to an original state (the state where the diaphragm 50 is away from the concave portions 431-433).

Further, when the diaphragm 50 is pressurized by the pressurizing rod 331, a measurement space (measurement chamber) defined by the concave 433 and the diaphragm 50 reduces its volume. Accordingly, the liquid contained in the concave portion 433 is moved via the groove 44.

Thus, a pump driving operation is realized by activating the pressing members 31, 32, 33.

[Explanation of Operation]

Now, operations of the liquid discharging device 1 will be described. The operations will be described also with reference to FIGS. 10-16. Note that FIGS. 12 to 16 schematically illustrates operations of each part, and that movement amount illustrated therein is exaggerated for convenience of explaining the operations.

In the present embodiment, the piezoelectric elements 17, 18 are controllably driven by the control device (not shown) that is connected thereto via the connector 8 mounted on the top surface of the pump case 5, so that the liquid discharging device 1 is driven. The control device is adapted to apply to the first piezoelectric element 17 a voltage ranging from a first preset value for the first piezoelectric element to a second preset value for the first piezoelectric element, while the control device is adapted to apply to the second piezoelectric element 18 a voltage ranging from a first preset value for the second piezoelectric element to a second preset value for the second piezoelectric element. In the present embodiment, each of the first preset values is set at "0", while the second preset values are determined in accordance with the types of the piezoelectric elements 17, 18 or with required displacement amount of the piezoelectric elements 17, 18.

In addition, the piezoelectric elements 17, 18 used are a piezoelectric element whose thermal expansion coefficient is "0" or a negative value. Accordingly, the spacers 127, 137 are interposed between the mounting portions 126, 136 and the piezoelectric elements 17, 18 to be bonded thereto, the spacer 127, 137 being formed of a material whose thermal expansion coefficient is large such as aluminum. Even when the length dimensions of the piezoelectric elements 17, 18 are changed due to temperature changes, the changed length dimensions are compensated by changes of the length dimensions of the spacers 127, 137. Therefore, the total length dimensions of the piezoelectric 17, 18 plus the spacers 127, 137 are maintained at a substantially constant value irrespective of the temperature changes, thereby enhancing invulnerability against the temperature changes.

Note that in order for the temperature changes to be dealt with in the above-described manner, the piezoelectric elements 17, 18 and the spacers 127, 137 need to be maintained at the same temperature. For this purpose, a gap between the piezoelectric elements 17, 18 and the displacement expanding plate 10 and a gap between the spacers 127, 128 and the displacement expanding plate 10 are filled with a heat transfer material such as silicon, so that the piezoelectric elements 17, 18 and the spacers 127, 137 are maintained at the same temperature.

[State of Original Point]

Figure 12:
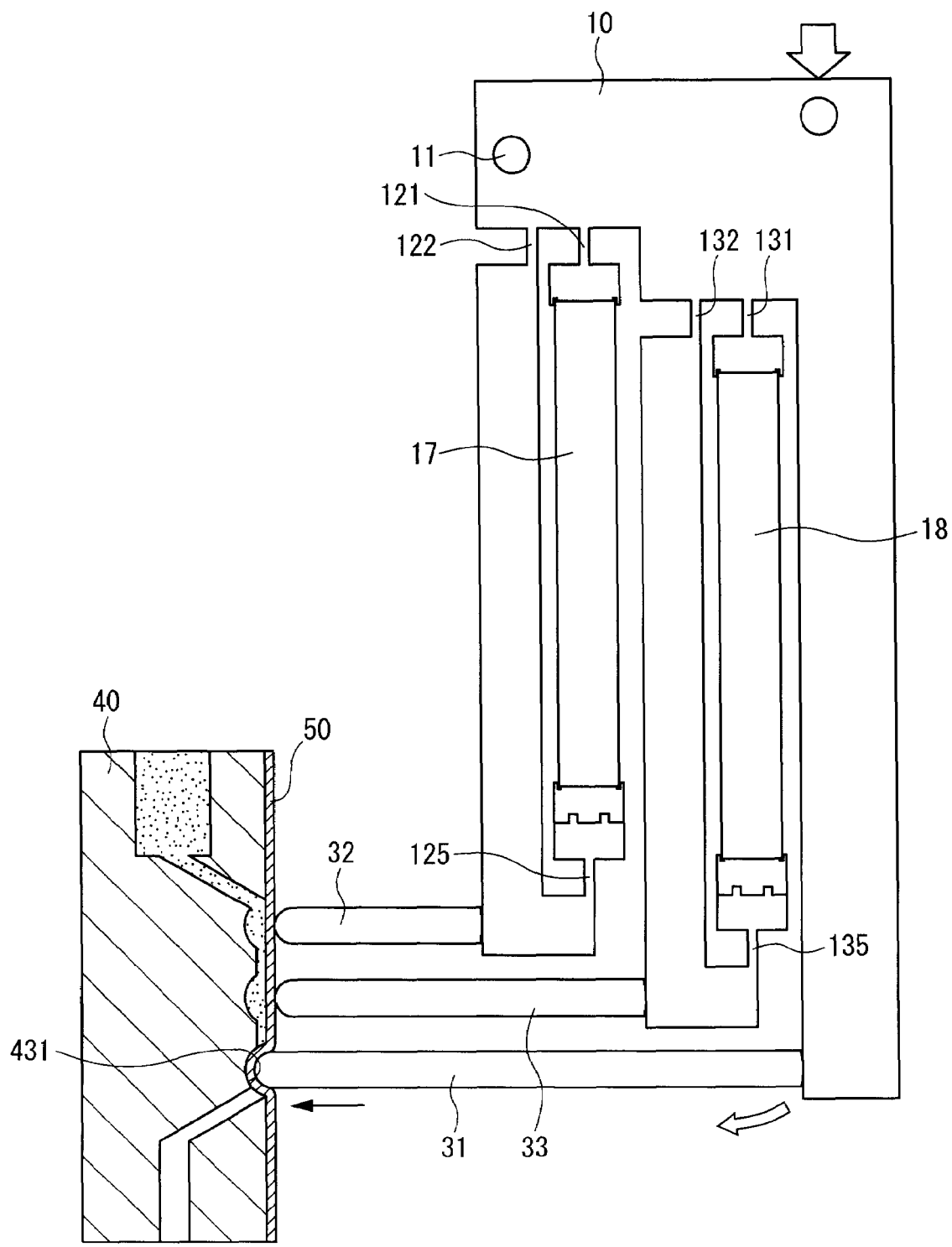
FIG. 12 is an explanatory illustration showing a state of an original point according to the first embodiment.

Before the start of the operations, i.e., in a non-driven state where the liquid discharging device 1 is stopped (state of original point), the control device applies no voltage to the piezoelectric elements 17, 18. Specifically, the control device applies the voltage of the first preset value to the piezoelectric elements 17, 18. In the present embodiment where the first preset value is "0" voltage value, no driving signal is input. In this sate, as shown in FIGS. 1 and 12, each of the hinges 121, 122, 125, 131, 132, 135 is configured not to be deformed.

In this state, the biasing unit 15 biases the displacement expanding plate 10 in the clockwise direction in FIG. 1. Then the arm 112 of the body 110 is rotated in the clockwise direction, so that the first pressing member 31 pressurizes the diaphragm 50. Accordingly, the diaphragm 50 closely fits to the concave portion 431, so that the outlet valve is closed.

At this time, the second pressing member 32 and the third pressing member 33 are arranged at a position where the diaphragm 50 is not pressurized. In this state, the inlet valve is open while the measurement chamber formed between the concave portion 433 and the diaphragm 50 retains a predetermined volume.

In short, the liquid discharging device 1 according to the present embodiment can supply the liquid to the measurement chamber in a pre-driving state where no voltage is applied to the piezoelectric elements 17, 18, since the outlet valve is closed and the inlet valve is open due to the biasing force of the biasing unit 15.

[Measuring Process]

Next, the control device applies a preset voltage to the first piezoelectric element 17. When the first piezoelectric element 17 is applied with the preset voltage, the first piezoelectric element 17 is expanded by a dimension in accordance with the applied voltage.

Figure 10:
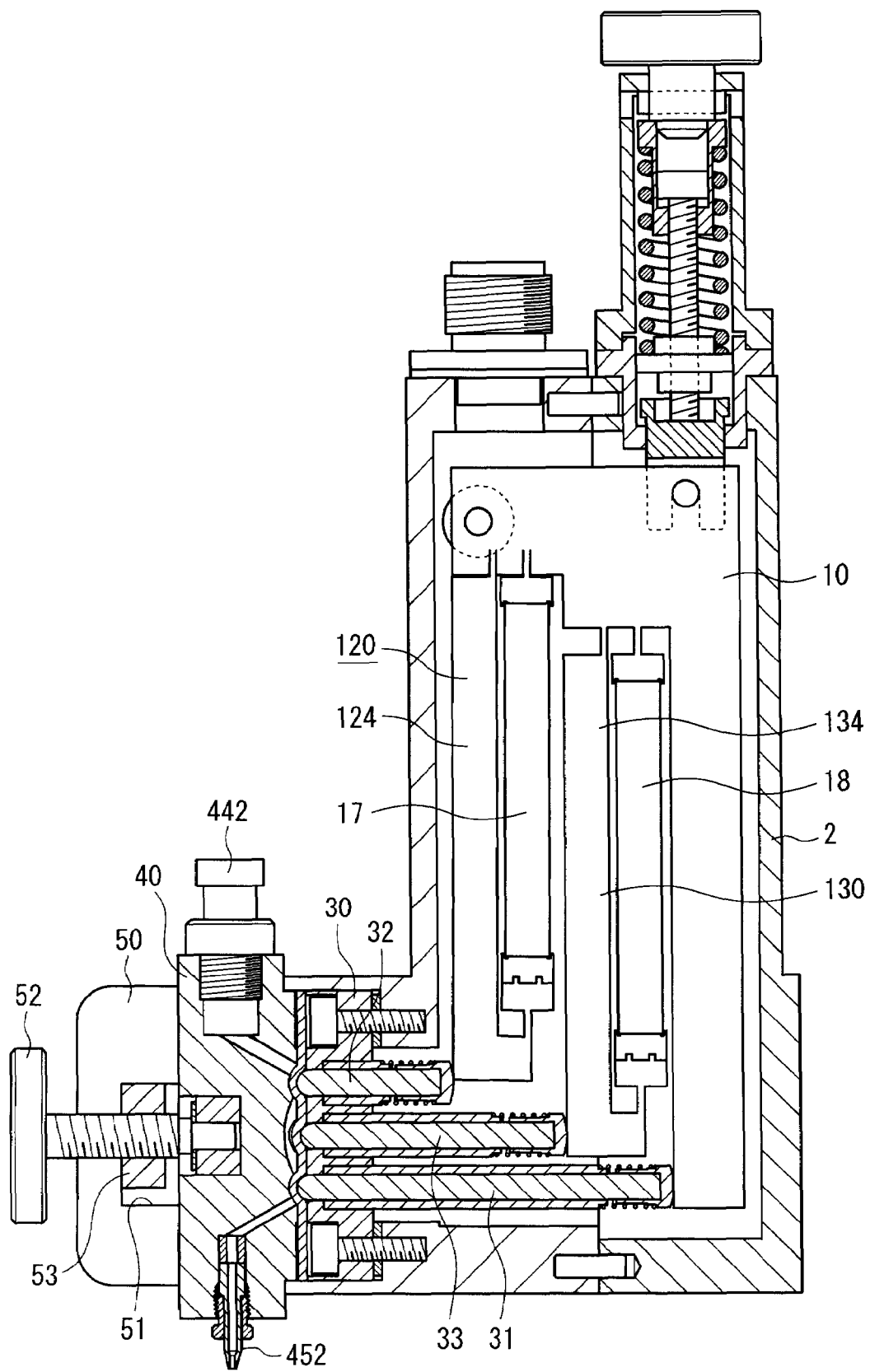
FIG. 10 is an illustration showing a state where a measuring process is performed according to the first embodiment.
Figure 13:
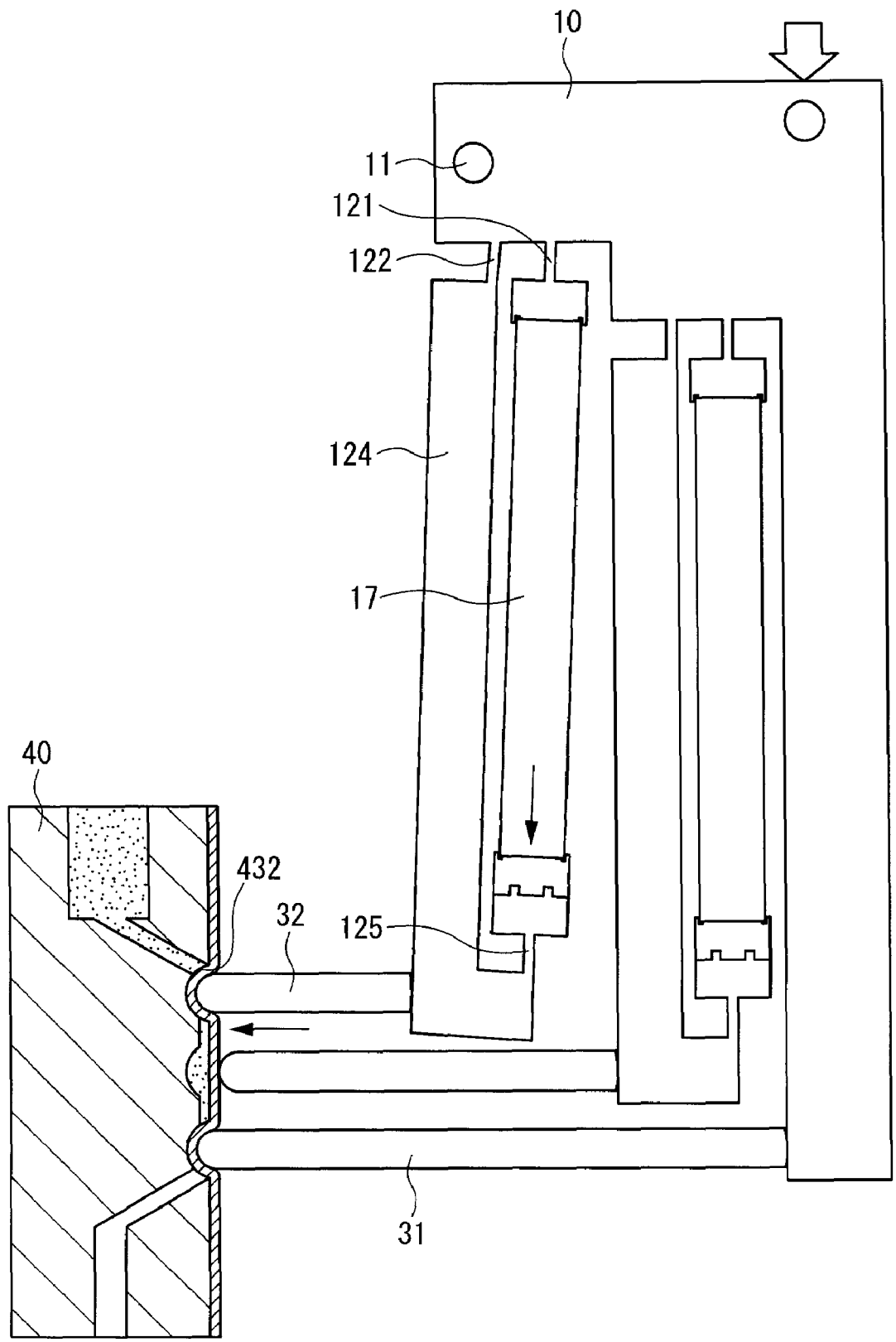
FIG. 13 is an explanatory illustration showing a state where the measuring process is performed according to the first embodiment.

When the longitudinal dimension of the first piezoelectric element 17 is expanded, the mounting portions 123, 126 to which the displacement portion 17 is mounted are away from the each other. Since the mounting portions 123, 126 are connected via the hinges 121, 122, 125 and the displacement portion 124, the lower ends of the displacement portion 124 and the piezoelectric element 17 are inclined to move toward the displacement portion (i.e., the second pressing member 32) due to the elastic deformation of the hinges 121, 122, 125. Accordingly, as shown in FIGS. 10 and 13, the second pressing member 32 moves toward the diaphragm 50, so that the diaphragm 50 is closely fits to the concave portion 432, whereby the inlet valve is closed.

Thus, both the outlet and inlet valves are closed, and the liquid inside the measurement chamber is enclosed from the liquid supplying side and liquid discharging side. Accordingly, the liquid is measured in accordance with the volume of the measurement chamber.

[Valve-Switching Process]

Further, the control device continues to apply the voltage to the first piezoelectric element 17. Accordingly, when the first piezoelectric element 17 is further expanded, the second pressing member 32 that is already pressed against the diaphragm 50 and cannot move toward the diaphragm 50 any further produces a reaction force against the biasing force of the biasing unit 15. Due to the reaction force, the entire displacement expanding plate 10 is moved against the biasing force in a counterclockwise direction, i.e., an opposite direction to the direction in which the plate is biased to move by the biasing unit 15.

Figure 11:
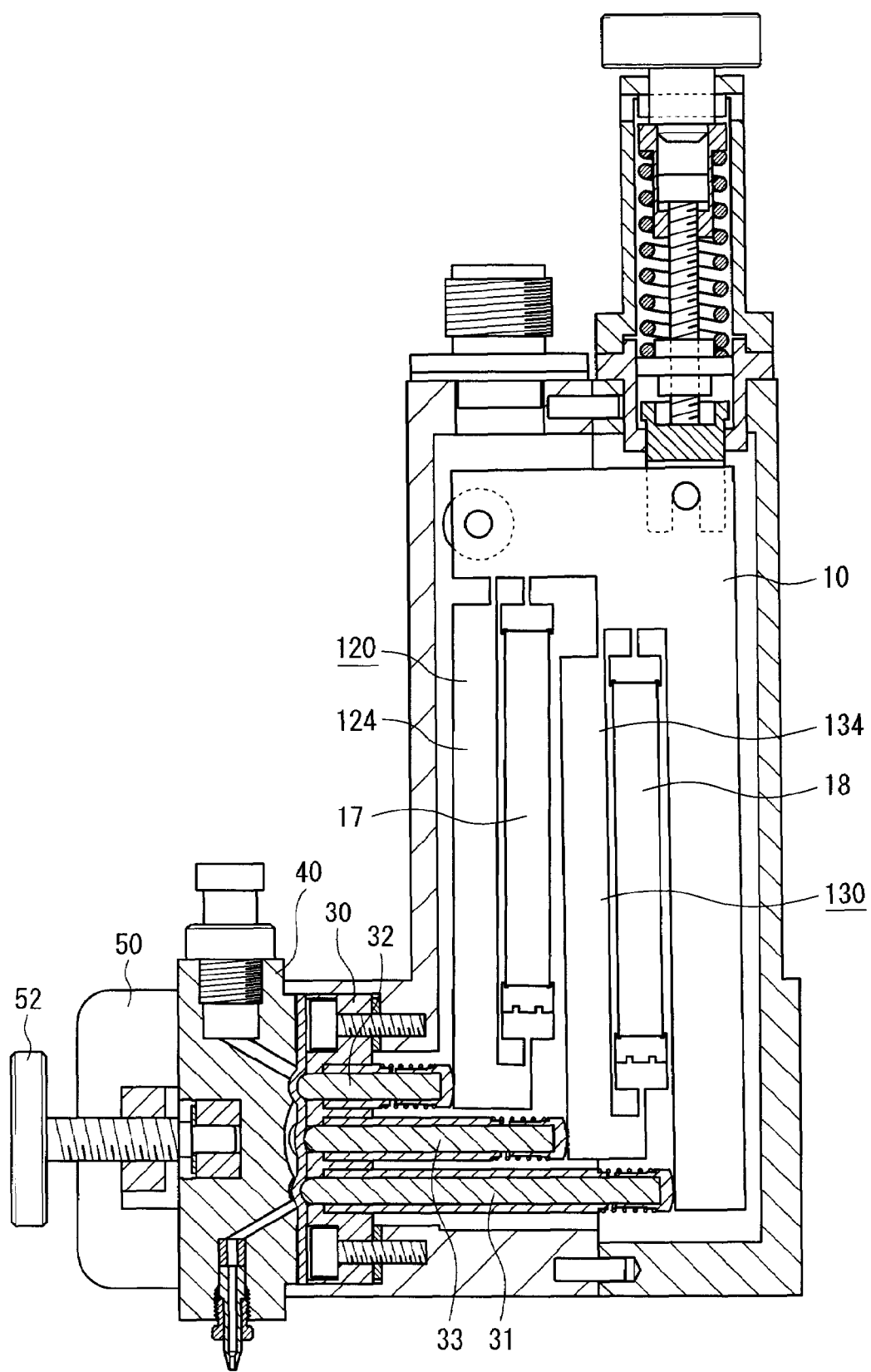
FIG. 11 is an illustration showing a state where a valve-switching process is performed according to the first embodiment.
Figure 14:
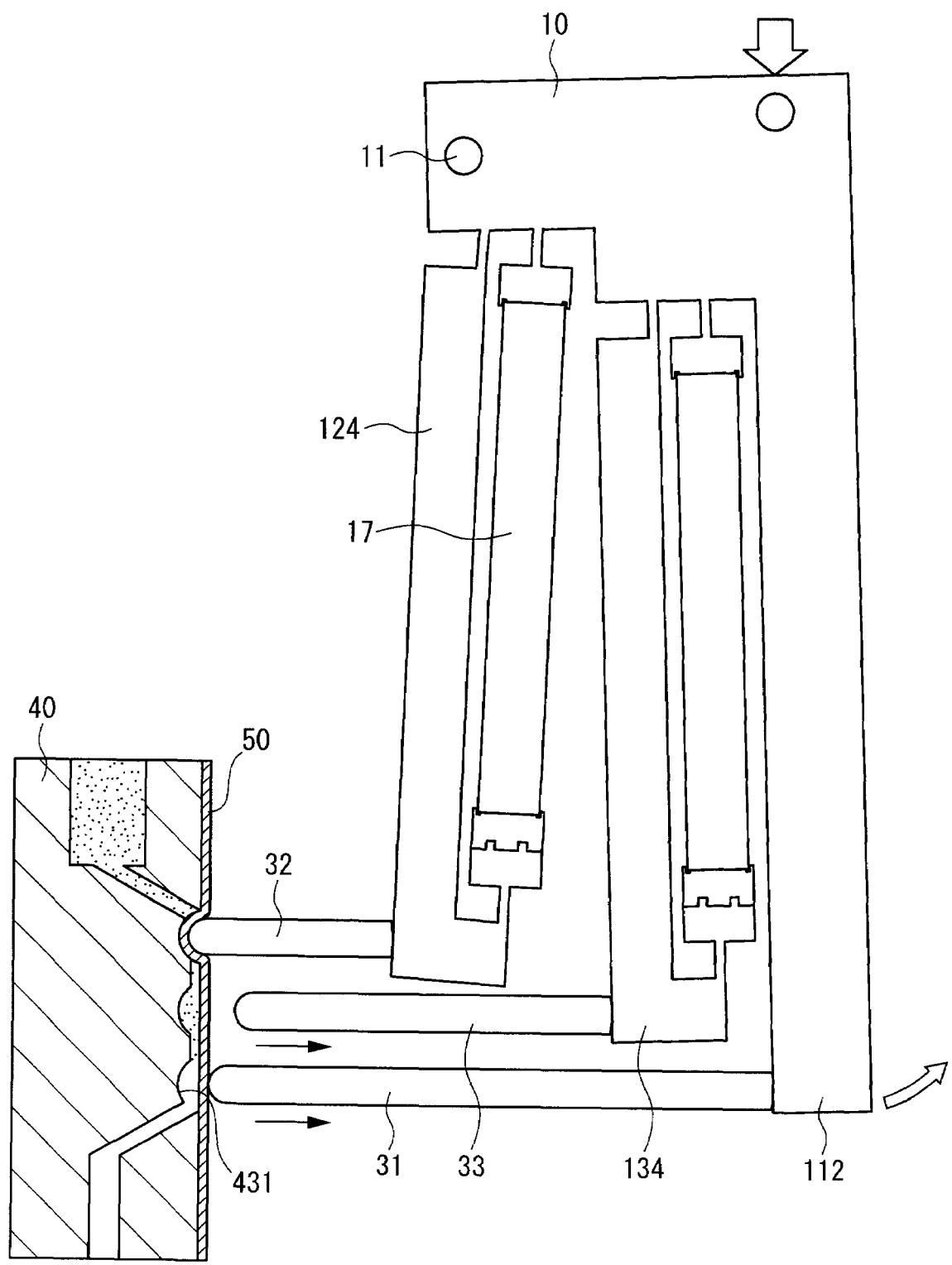
FIG. 14 is an explanatory illustration showing a state where the valve-switching process is performed according to the first embodiment.

Subsequently, as shown in FIGS. 11 and 14, the first pressing member 31 is moved in a direction to be away from the diaphragm 50, so that the diaphragm 50 is away from the concave portion 431. Consequently, the outlet valve is opened. Accordingly, the inlet valve is closed and the outlet valve is opened, whereby a valve-switching operation is performed.

[Discharging Process]

Figure 15:
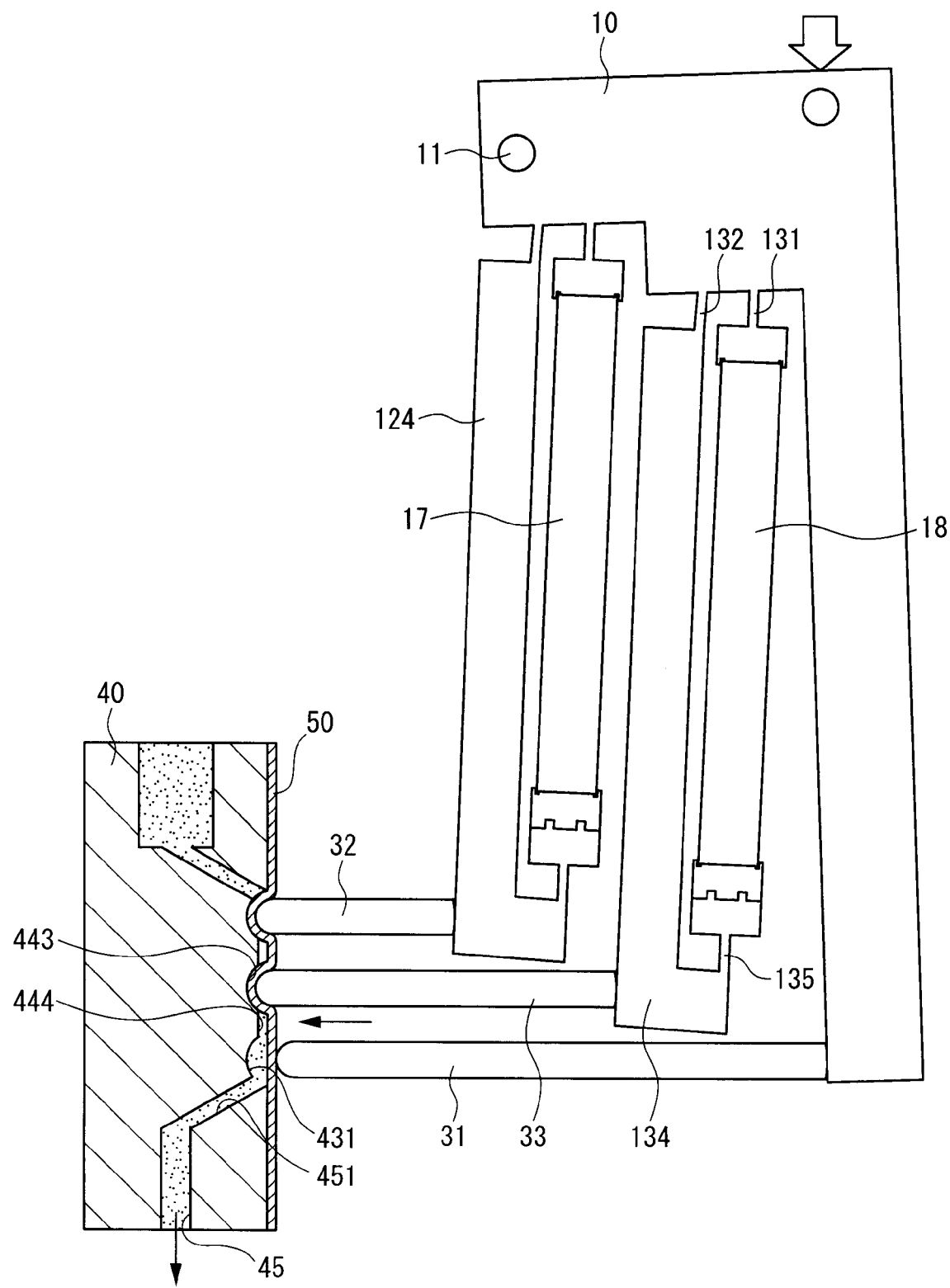
FIG. 15 is an explanatory illustration showing a state where the discharging process is performed according to the first embodiment.

Now, the control device applies a predetermined voltage to the second piezoelectric element 18 while continuing to apply the voltage to the first piezoelectric element 17. Then, the second piezoelectric element 18 is expanded in accordance with the applied voltage. Due to the expansion, the hinges 131, 132, 135 is elastically deformed, so that the lower ends of the displacement portion 134 and the piezoelectric element 18 are inclined to move toward the displacement portion 134, in other words, toward the third pressing member 33. Subsequently, as shown in FIG. 15, the third pressing member 33 moves toward the diaphragm 50. Due to the movement, the measurement space between the diaphragm 50 and the concave portion 433 reduces its volume. Then, in the state where the inlet valve is closed while only the outlet valve is open, the liquid enclosed inside the measurement space is conveyed to the concave portion 431 via the groove 444, such that the liquid further passes through the discharge channel 451 and the discharge port 45 to be discharged from the nozzle 452.

Note that the discharge amount is adjusted by the volume change of the measurement space (i.e., the movement amount of the third pressing member 33). Thus the discharge amount can be easily controlled by controlling the voltage applied to the second piezoelectric element 18.

[Valve-Switching and Suctioning Process]

Once the discharge of the liquid of a predetermined amount is completed, first of all, the voltage application to the first piezoelectric element 17 is suspended, such that the piezoelectric element 17 restores its original length dimension. Then, the displacement portion 124 is moved in the counterclockwise direction. In response to the movement amount, the displacement expanding plate 10 is biased to be rotated in the clockwise direction by the biasing unit 15.

Figure 16:
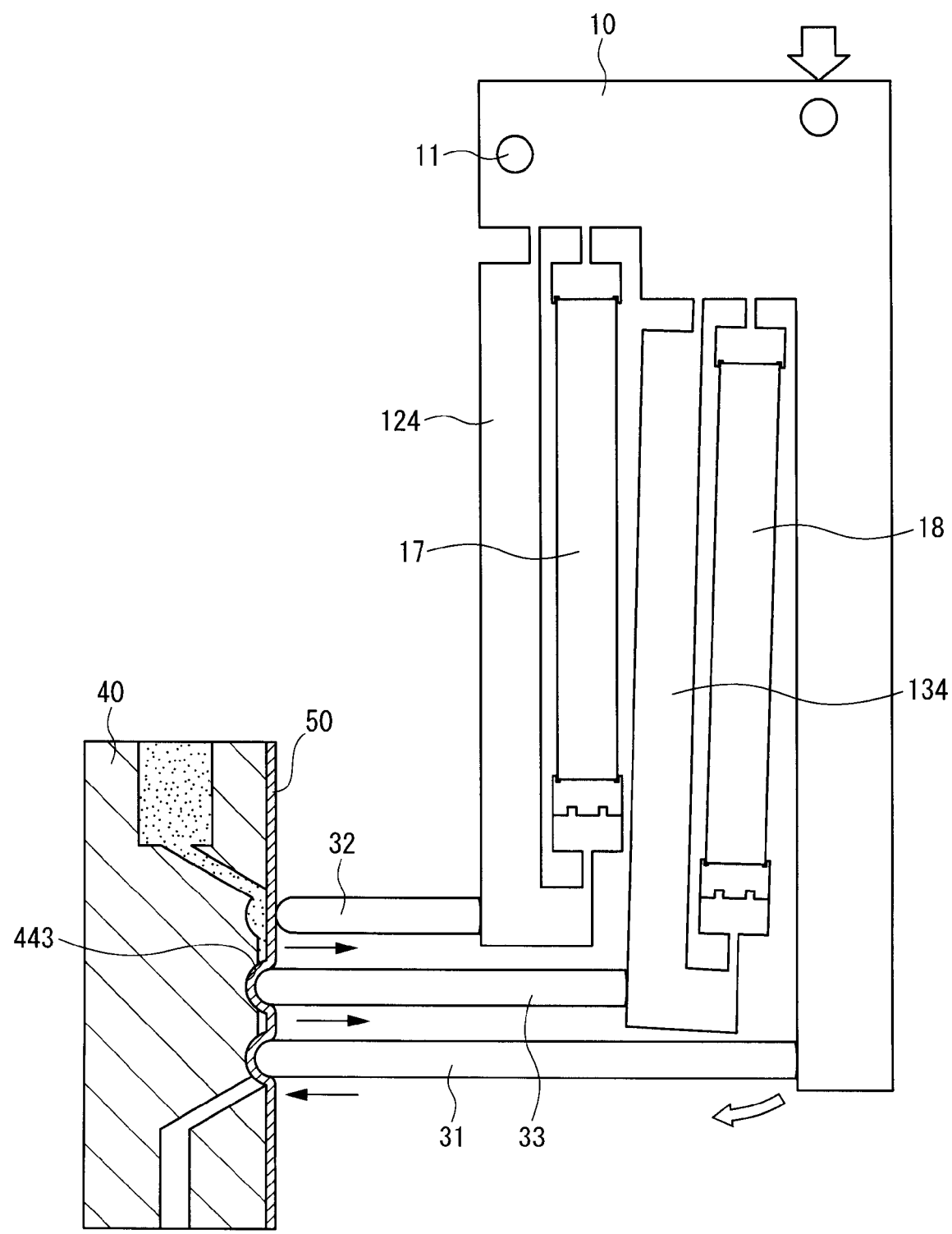
FIG. 16 is an explanatory illustration showing a state where a valve-switching and suctioning process is performed according to the first embodiment.

As shown in FIG. 16, following the rotation of the displacement expanding plate 10 in the clockwise direction, the first pressing member 31 is moved toward the diaphragm 50 for pressurizing, then the outlet valve is closed. In conjunction with the continuous displacement of the displacement portion 124 in the counterclockwise direction after the closure of the outlet valve, the second pressing member 32 is moved in the direction to be away from the diaphragm 50. Then, the diaphragm 50 is away from the concave portion 432, such that the inlet valve is opened. Accordingly, the open outlet valve is switched to be closed while the closed inlet valve is switched to be opened, whereby the valve-switching operation is performed.

In addition, the control device suspends the voltage application to the second piezoelectric element 18 at the same timing when the outlet valve is closed. Then, the second piezoelectric element 18 also restores its original length dimension. Following the displacement of the displacement portion 134 in the counterclockwise direction, the third pressing member 33 is moved in the direction to be away from the diaphragm 50. The diaphragm 50 that has been pressurized by the third pressing member 33 is away from the concave portion 433, such that the measurement space increase the volume. At this time, as described above, since the closed inlet valve has been switched to be opened, the liquid is suctioned into the concave portion 433, i.e., the measurement space, from the liquid suction port 44 in accordance with the movement of the third pressing member 33.

Then, each of the members is returned to the original position as shown in FIGS. 1 and 12.

By repeating the above-described operations, the liquid is discharged by the predetermined amount. In addition, the discharge amount of the liquid can be accurately controlled using the expanding amount of the second piezoelectric element 18, in other words, the applied voltage value.

In order for the voltage not to be applied to the piezoelectric elements 17, 18, an electrical discharge may be caused by short-circuiting the terminals for applying the voltage to the piezoelectric elements 17, 18.

Note that when the displacement expanding plate 10 is moved in the counterclockwise direction due to the voltage applied to the first piezoelectric element 17, whether or not to apply the voltage to the second piezoelectric element 18 may be selectively determined. When no voltage is applied, the third pressing member 33 as well as the first pressing member 31 is moved in the direction to be away from the diaphragm 50. With this arrangement, when the voltage is applied to the second piezoelectric element 18 so that the third pressing member 33 moves toward the diaphragm 50 for the liquid discharge, the discharge may be possibly slightly delayed.

To prevent the delay in the liquid discharge, when the displacement expanding plate 10 is moved in the counterclockwise direction due to the voltage applied to the first piezoelectric element 17, the voltage may be applied to the second piezoelectric element 18 so that the third pressing member 33 moves toward the diaphragm 50 by an amount to offset the movement amount of the third pressing member 33 which is caused by the rotation of the displacement expanding plate 10. In short, the third pressing member 33 may be controlled to maintain a constant position relative to the diaphragm 50.

In addition, when the third pressing member 33 is moved for the completion of the liquid discharge, the length of the first piezoelectric element 17 may be contracted by controlling the voltage applied to the first piezoelectric element 17 such that the displacement expanding plate 10 is biased to be rotated by the biasing unit 15 in the clockwise direction and the first pressing member 31 is moved. The outlet valve is closed simultaneously with the completion of the liquid discharge.

In the above explanation, as shown in FIG. 14, after the valve-switching operation is performed, the voltage is applied to the second piezoelectric element 18 so that the third pressing member 33 is moved for the liquid discharge, and the discharge mount is adjusted by controlling the movement amount of the third pressing member 33 with the voltage value applied to the second piezoelectric element 18.

Contrastingly, by adjusting the time until (the timing of) the voltage application to the second piezoelectric element 18 after the voltage is applied to the first piezoelectric element 17, the discharge amount of the liquid may be adjusted.

Specifically, immediately after the second pressing member 32 starts to move due to the voltage application to the first piezoelectric element 17, the voltage is applied to the second piezoelectric element 18 so that the third pressing member 33 moves. Then, before the second pressing member 32 closes the inlet valve, the third pressing member 33 pressurizes the diaphragm 50, such that the measurement space reduces its volume. In this manner, the shorter the time until the voltage application to the second piezoelectric element 18 after the voltage is applied to the first piezoelectric element 17 is, the smaller the liquid amount contained between the valves when the inlet valve is closed becomes. Accordingly, the liquid discharge amount can be adjusted by controlling the timing of the voltage application.

Note that in this case, when the inlet valve is closed and the outlet valve is alternatively opened, the third pressing member 33 pressurizes a portion of the diaphragm 50 that corresponds to the measurement space. Accordingly, the liquid inside the measurement space is instantly passes through the discharge channel 451 and the discharge port 45 to be discharged from the nozzle 452. Thus, it is possible to prevent the liquid from being suctioned back into the nozzle 452 due to a negative pressure caused when the outlet valve is opened.

[Maintenance]

For cleaning the liquid channels when changing the kind of the liquid supplied via the liquid discharging device 1 or when a daily operation is terminated, the block mounting screw 62 is rotated for the stay 63 to be detached from the openings 61 of the side plates 60. Then the channel block 40 and the diaphragm 50 can be detached from the pump case 5. In this embodiment, the members that contacts the liquid are only the channel block 40 and the diaphragm 50. Thus, it is only required to detach these members therefrom for the cleaning and the other parts do not need to be dissolved. With this arrangement, the maintenance operation can be easily performed.

By performing the same operation, the replacement of the diaphragm 50 can be also easily made. Further, in replacing the diaphragm 50 with a diaphragm of a different thickness dimension, the space between the guide block 20 and the channel block 40 is adjusted by replacing the height adjusting shim 24 where necessary. Thus, such a replacement is also made easily.

According to the present embodiment, the following advantage can be obtained:

(1) Since the piezoelectric elements 17, 18 are used to drive the diaphragm 50 for the liquid discharge, the liquid discharging device 1 can be made compact, lightweight and thin. Specifically, compared with a device employing a drive mechanism using a servomotor, solenoid and cam, the liquid discharging device 1 is more easily made compact, lightweight and thin.

Thus, when the liquid discharging device 1 according to the present embodiment is used for discharging adhesives or a variety of pastes in production lines for various products, the device can be mounted on an arm of a robot to be transferred at high speed and high acceleration. Therefore, shortening takt time in the production lines can be realized, thereby contributing to productivity improvement. In addition, when a plurality of liquid discharging devices 1 are arrayed, the space between each of the liquid discharging devices can be narrowed (2) The piezoelectric elements 17, 18 are adapted to be driven at high speed. Thus, the liquid discharging device can perform the discharging operation, for example, 10 to 100 times or more per second, thereby realizing a liquid discharging operation at higher speed than an air-cylinder driven device. Further, the piezoelectric elements 17, 18 generate more force than an air-cylinder. Thus, even when the nozzle 452 is made thinner and resistance is increased, the liquid discharging device can eject and discharge the liquid. The liquid discharging device can finely eject water of, for example, 0.01 microliter, whereby a stable operation is realized.

Further, since the movement of the pressing members 31, 32, 33 can be controlled by controlling the voltage applied to the piezoelectric elements 17, 18, a control can be easily made such that the voltage applied to the first piezoelectric element 17 is controlled to move the first pressing member 31 by the biasing unit 15 and the outlet valve is closed at the same time when the discharging process in which the voltage is applied to the second piezoelectric element 18 is terminated. Thus, the liquid discharging device is easily controlled such that the outlet valve is closed as soon as the discharging process is terminated. With this control, the liquid discharging device can spit the liquid quickly without dripping and eject the liquid finely. Thus, it is possible to realize a discharging operation in which the accuracy of the discharge amount is improved and stabilized. Such a liquid discharging device can spit even an infinitesimal amount of liquid.

(3) The preset amount of the discharge liquid can be easily changed by adjusting the movement amount of the third pressing member 33 in the discharging process by controlling the voltage value applied to the second piezoelectric element 18. With this arrangement, even in the middle of discharging, the discharge amount per discharge operation can be automatically adjusted. Specifically, for example, in a process to mount a plurality of electronic components on a substrate, in order to apply a different amount of an adhesive per mounting position of the electric components, the amount of the adhesive to be discharged on the substrate is required to be changed. Taking another example, in a production line where a plurality of products are conveyed in a mixed state, an amount of liquid may be required to be changed per product. Even in the above examples, the liquid discharging device 1 can easily change the discharge amount, thereby enhancing the usability.

(4) The driving of the second pressing member 32 and the third pressing member 33 are controlled with the movement of the pair of piezoelectric elements 17, 18; the displacement expanding plate 10 supporting the piezoelectric elements 17, 18 is biased by the biasing unit 15 in the clockwise direction to move the first pressing member 31 toward the diaphragm 50; and the piezoelectric element 17 is continuously expanded even after the second pressing member 32 pressurizes the diaphragm 50, such that the displacement expanding plate 10 moved against the biasing force by the biasing member 15 and rotates in the counterclockwise direction. Consequently, the first pressing member 31 is moved in the direction to be away from the diaphragm 50. In this manner, the driving of the first pressing member 31 is controlled.

As described above, in the present embodiment, the displacement expanding plate 10 is adapted to rotate around the cases 4 and 5 using the biasing unit 15 and the reaction force is utilized that is produced when the first pressing member 31 is pressed against the diaphragm 50 in the middle of the stroke operation. With this arrangement, by merely controlling the driving of the pair of piezoelectric elements 17, 18, the driving of the three members (the first to third pressing members 31, 32, 33) can be controlled. Accordingly, the liquid discharging device is free from a problem of complexity of the piezoelectric elements alignment and the driving control, the problem as seen in a case where three members are driven by three piezoelectric elements. Thus, the production cost of the liquid discharging device 1 can be reduced.

In addition, when the piezoelectric elements 17, 18 are expanded due to the voltage application, the piezoelectric elements 17, 18 themselves are also inclined as well as the displacement portions 124, 134. With this arrangement, the configurations of the first displacement portion 120 and the second displacement portion 130 can be highly simplified, thereby simplifying the manufacturing and reducing the cost.

(5) The displacement expanding plate 10 is rotated about the shaft 11. In this arrangement, the positioning accuracy can be more easily improved than in an arrangement where the plate is slidably moved, thereby improving the assembly performance.

(6) Since the displacement expanding plate 10 to which the piezoelectric elements 17, 18 are attached is integrally formed, the displacement amount of the displacement portions 124, 134 corresponding to the expansion and contraction of the piezoelectric elements 17, 18 can be accurately set. Accordingly, the movement amount of the first to third pressing members 31, 32, 33 can be accurately set, and the liquid discharging device can discharge even a minute amount of liquid with a high accuracy.

(7) When the voltage applied to the piezoelectric elements 17, 18 is turned to be "0", the liquid discharging device 1 is set to become the state of the origin point (non-driven state). Thus, when no operation is performed, the piezoelectric elements 17, 18 generate no heat and there is no temperature rise. Accordingly, the piezoelectric elements 17, 18 can be prevented from having a variation of the displacement amount affected by the temperature change, thereby improving the accuracy of the displacement amount of the piezoelectric elements 17, 18, i.e., the accuracy of the discharge amount of the liquid.

(8) In the present embodiment, the discharge amount of the liquid is determined only based on the stroke of the third pressing member 33. Therefore, even when the cases 4, 5 expand affected by external temperature, the accuracy of the discharge amount is not affected and even an infinitesimal amount of the liquid can be discharged with a high accuracy.

(9) In order for liquid that has a high degree of viscosity to be discharged at high speed, the liquid needs to be extruded with high pressure. As the liquid discharging device uses as a driving source the mechanical driving force of the piezoelectric elements 17, 18, the liquid discharging device can have a more powerful driving force than a device whose driving source is an air-cylinder. Thus, the liquid discharging device can discharge the liquid at high speed.

In addition, since the liquid discharge device can discharge the liquid from an upper position that is away from an adhered object such as a substrate, whether or not the discharging operation is performed can be confirmed when, for example, an infrared radiation sensor is externally provided to the liquid discharging device 1.

As the liquid discharging device 1 does not have any check valves, the liquid can be pressurized to be conveyed. Thus, even liquid having a high viscosity can be easily supplied into the liquid discharging device 1.

(10) Further, when no voltage is applied to the piezoelectric elements 17, 18, the displacement expanding plate 10 is biased by the biasing unit 15, such that the diaphragm 50 is pressurized by the first pressing member 31 to closely fit to the concave portion 431. Thus, the outlet valve is closed due to the spring force of the biasing force 15. Accordingly, even when the thickness dimension of the diaphragm 50 is not constant, or when the position of the concave formation surface 43 varies, the diaphragm 50 is biased by the biasing unit 15 until the diaphragm 50 abuts on the concave formation surface 43. Hence, the outlet valve is reliably closed.

Specifically, the outlet valve can be a normally-closed-type valve that is closed when no voltage is applied. In addition, the abutting force of the diaphragm 50 on the concave formation surface 43 when the valve is closed can be set using only the spring force of the biasing unit 15, and the closed state of the outlet valve can be stably maintained.

(11) In addition, the force to press the diaphragm 50 against the concave formation surface 43 can be set using only the spring force of the biasing unit 15. It is advantageous when, for example, the diaphragm 50 and the channel block 40 are detached for cleaning and attached again thereafter. In such a case, the attachment position may be slightly different from the original position. However, despite such a slight difference, the force to press the diaphragm 50 can be maintained at a substantially constant level because the diaphragm 50 is pressed against the concave formation surface 43 by the biasing unit 15. In this respect also, the outlet valve can be maintained to be stably closed. With this arrangement, the replacement operation of the diaphragm 50 can be facilitated. Particularly, although the diaphragm 50 contacting the liquid is an expendable item, which necessitates the replacement operation, the replacement operation is facilitated as described above, thereby improving the maintenance performance.

(12) The members that contacts the liquid are only the channel block 40 and the diaphragm 50. Thus, it is only required to detach these members therefrom for the cleaning and the inside of the cases 4 and 5 do not need to be dissolved. With this arrangement, the maintenance operation such as cleaning can be easily performed.

In addition, the channel block 40 is clamped to the pump case 5 for the fixture using the block mounting screw 62. By merely rotating the block mounting screw 62 to detach the stay 63 from the side plates 60, the channel block 40 and the diaphragm 50 are detached. Therefore, the maintenance operation can be performed more easily.

(13) Unless the piezoelectric elements 17, 18 are expanded with the voltage applied thereto, the biasing force of the biasing unit 15 is not applied to the hinges 121, 122, 125, 131, 132, 135 of the displacement expanding plate 10 or to the piezoelectric elements 17, 18, thereby reducing the influence of the biasing force which the biasing unit 15 applies to the hinges 121, 122, 125, 131, 132, 135 and to the piezoelectric elements 17, 18.

(14) In the state where the outlet valve is closed, after the second pressing member 32 is extended such that the diaphragm 50 is pressurized to close the inlet valve, the outlet valve is opened by the first pressing member 31. Conversely, in the state where the inlet valve is closed, after the second pressing member is retracted, the inlet valve is opened by the second pressing member 32. Accordingly, either of the valves is assured to be closed for the prevention of the direct communication between the liquid suction port 44 and the liquid discharge port 45. Thus, the pumping operation can be reliably realized.

Second Embodiment

Figure 17:
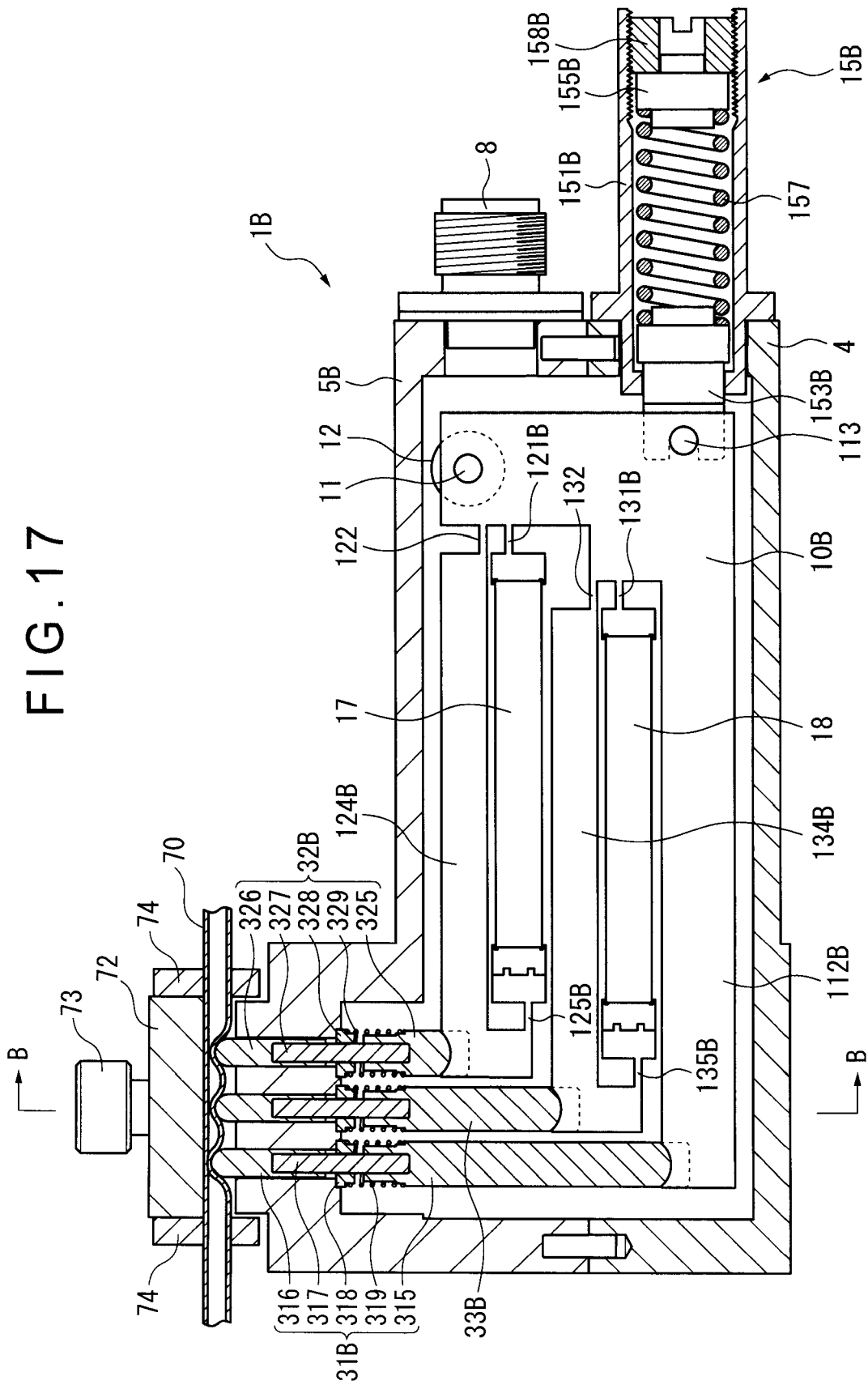
FIG. 17 is a vertical cross-sectional view of a liquid discharging device according to a second embodiment of the present invention.
Figure 18:
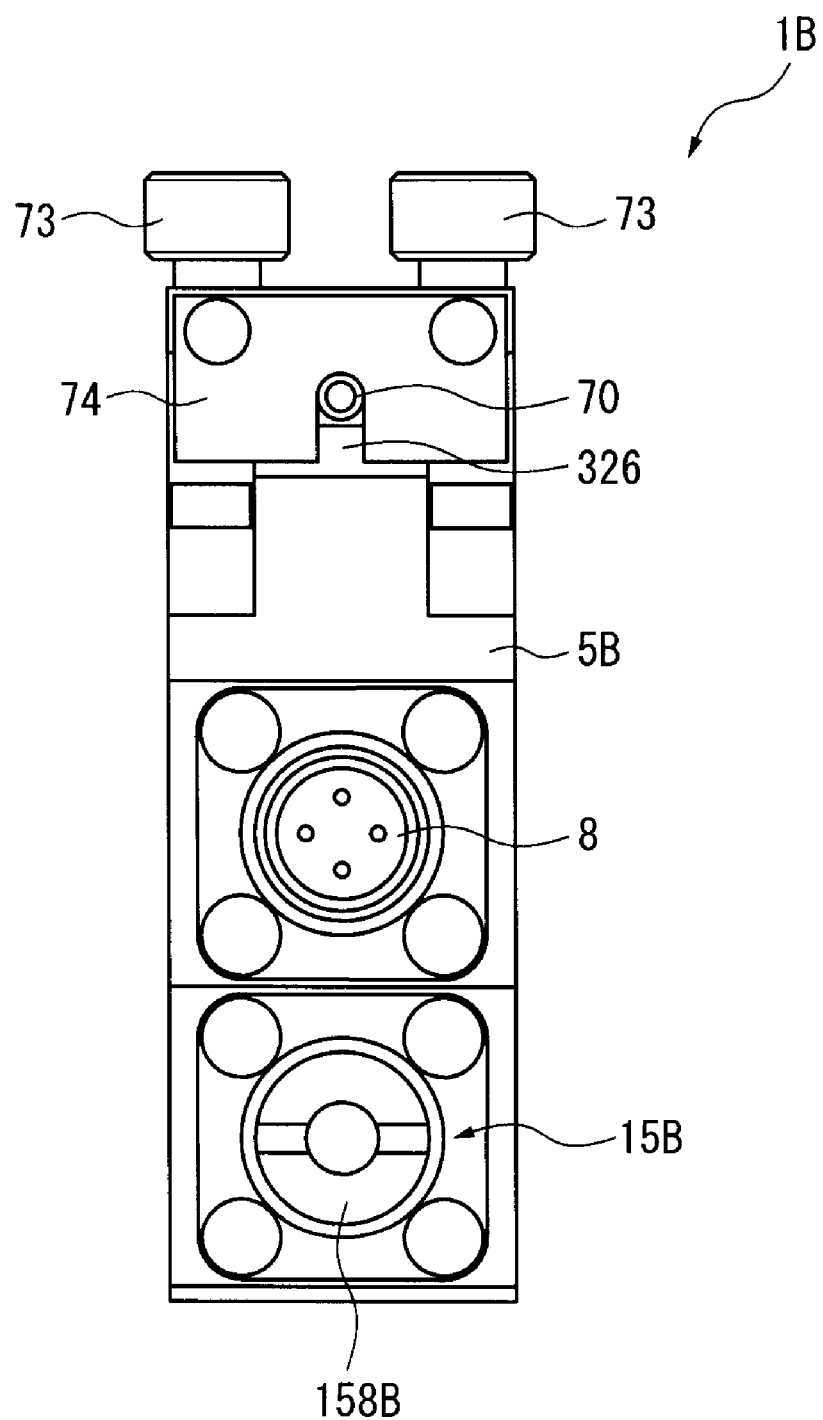
FIG. 18 is a side view of the second embodiment according to the present invention.
Figure 19:
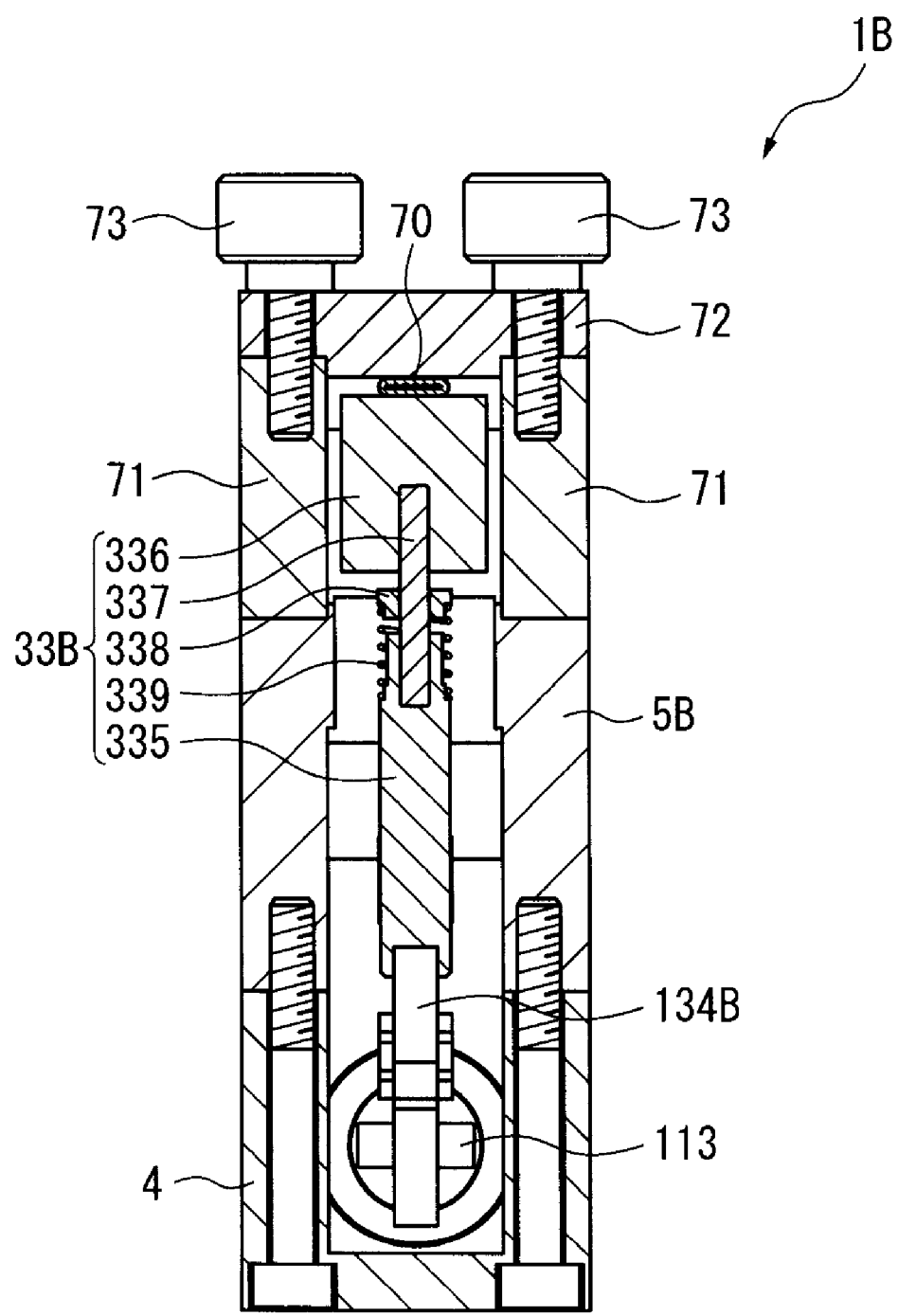
FIG. 19 is a cross-section taken along B-B line in FIG. 17.

Now, a second embodiment of the present invention will be described below with reference to FIGS. 17 to 19. In each of the following embodiments, the same numeral is given to a similar component to or the same component as that of the preceding embodiment, and the description for it is omitted or simplified.

A liquid discharging device 1B according to the second embodiment is a tube pump that uses a tube 70 in place of the diaphragm 50. First to third pressing members 31B to 33B to pressurize the tube 70, a displacement expanding plate 10B and a biasing unit 15B operate similarly to those in the first embodiment, although they may have arrangements and shapes different from those of the first embodiment The displacement expanding plate 10B has substantially the same arrangement with the displacement expanding plate 10. However, first hinges 121B, 131B are provided more closely to the second hinges 122, 132 than the first hinges 121, 131 in the first embodiment and third hinges 125B, 135B are provided more apart from displacement portions 124B, 134B than the third hinges 125, 135 in the first embodiment.

Accordingly, when the piezoelectric elements 17, 18 are expanded by the same dimension, the displacement portions 124B, 134B and the piezoelectric elements 17, 18 in the second embodiment has a larger inclination angle due to the positional relationship of the hinges than in the first embodiment. Thus, the movement amount of the second and third pressing members 32B, 33B is also arranged to be larger.

In addition, parts of an arm 112B and the displacement portions 124B, 134B that abut on the first to third pressing member 31B to 33B are shaped in a circular arc concave.

On the other hand, the first to third pressing members 31B to 33B pressurizing the tube 70 have pressing rods 315, 325, 335, tube pressing members 316, 326, 336, connection rods 317, 327, 337 connecting the pressing rods 315, 325, 335 with the tube pressing member 316, 326, 336, spring washers 318, 328, 338 and return springs 319, 329, 339 provided between the pressing rods 315, 325, 335 and the spring washers 318, 328, 338.

The tube pressing members 316, 326, 336 are formed in a plate shape and arranged to reliably pressurize the tube 70.

In addition, parts of the pressing rods 315, 325, 335 that contact the arm 112B and the displacement portions 124B, 134B respectively have a groove into which the arm 112B and the displacement portions 124B, 134B are arranged. Bottom surfaces of the grooves are formed in a circular arc shape to abut on concave portions of the arm 112B and the displacement portions 124B, 134B.

A pair of tube receiver mounting plates 71 are fixed to a pump case SB, and a tube receiver block 72 is fixed to the tube receiver mounting plates 71 by a mounting screw 73. A pair of tube sets are arranged interposing the tube receiver block 72, and the tube 70 is inserted through the tube sets.

Further, a biasing unit 15B includes a spring case 151B, a connecting member 153B, an adjusting spring washer 155B, the coil spring 157 and a spring pressing member 158B.

In the biasing unit 15B, the spring pressing member 158B screwed inside the spring case 151B is rotated for adjusting the position in the axial direction, such that the space between the connecting member 153B and the adjusting spring washer 155B is adjusted. In this manner, the biasing force that the coil spring 157 applies can be controlled.

In the liquid discharging device 1B arranged as described above, the first to third pressing members 31B to 33B can advance and retreat due to the biasing force of the biasing unit 15B and the operation of the piezoelectric elements 17, 18. The pressing members pressurize the tube 70 in turn, thereby realizing the liquid discharge.

For instance, the liquid discharging device 1B is set such that the first pressing member 31B opens and closes the outlet valve, that the second pressing member 32B opens and closes the inlet valve, and that the third pressing member 33B pressurizes the tube between the valves, i.e., the measurement chamber. With this setting, the liquid discharging device 1B can discharge the liquid in turn operating in the same way with that of the first embodiment.

The liquid discharging device 1B according to the second embodiment can also provide advantages similar to those obtained using the liquid discharging device 1 according to the first embodiment.

It should be noted that the invention is not limited to the first or second embodiment above, but includes modifications and improvements as long as advantages of some aspects of the invention can be achieved.

Figure 20:
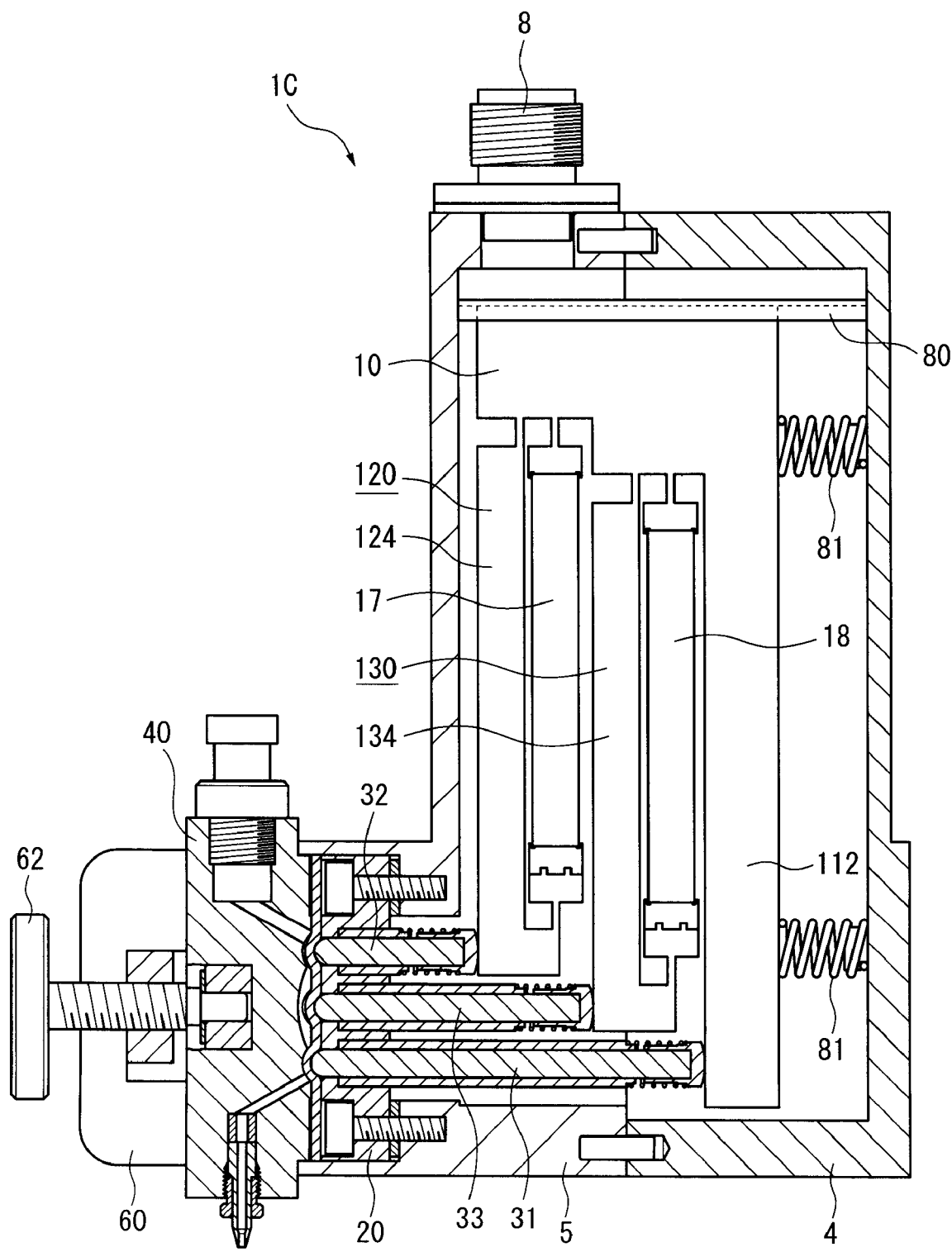
FIG. 20 is a vertical cross-sectional view showing a first modification according to the present invention.

For instance, the displacement expanding plates 10, 10B are adapted to rotate around the shaft 11 in the first and second embodiments. The displacement expanding plates 10, 10B may be slidably provided. As shown in FIG. 20, for example, a liquid discharging device 1C that is a diaphragm pump may have a guide rail 80 to guide the displacement expanding plate 10 and a spring 81 between the case 4 and the displacement expanding plate 10 as a biasing unit to bias the displacement expanding plate 10 to the diaphragm 50. In the liquid discharging device 1C described above, when no voltage is applied to the piezoelectric elements 17, 18, the displacement expanding plate 10 is moved toward the diaphragm 50, such that the first pressing member 31 pressurizes the diaphragm 50 for the closure of the outlet valve. When the voltage is applied to the piezoelectric element 17, the second pressing member 32 responds to the displacement of the displacement portion 124 and pressurizes the diaphragm 50 for the closure of the inlet valve. After the inlet valve is closed, owing to the reaction force produced due to the further expansion of the piezoelectric element 17, the displacement expanding plate 10 is moved against the biasing force applied by the spring 81 in the direction to be away from the diaphragm 50. In this manner, the first pressing member 31 can be moved in the direction to be away from the diaphragm 50 to open the inlet valve. Further, when the second piezoelectric element 18 is expanded due to the voltage application in this state, the third pressing member 33 can pressurize the diaphragm 50 to discharge the liquid. Accordingly, the liquid discharging device 1C can operate to discharge the liquid in a manner similar to that of the first embodiment and provide advantages similar to those obtained in the first embodiment.

Figure 21:
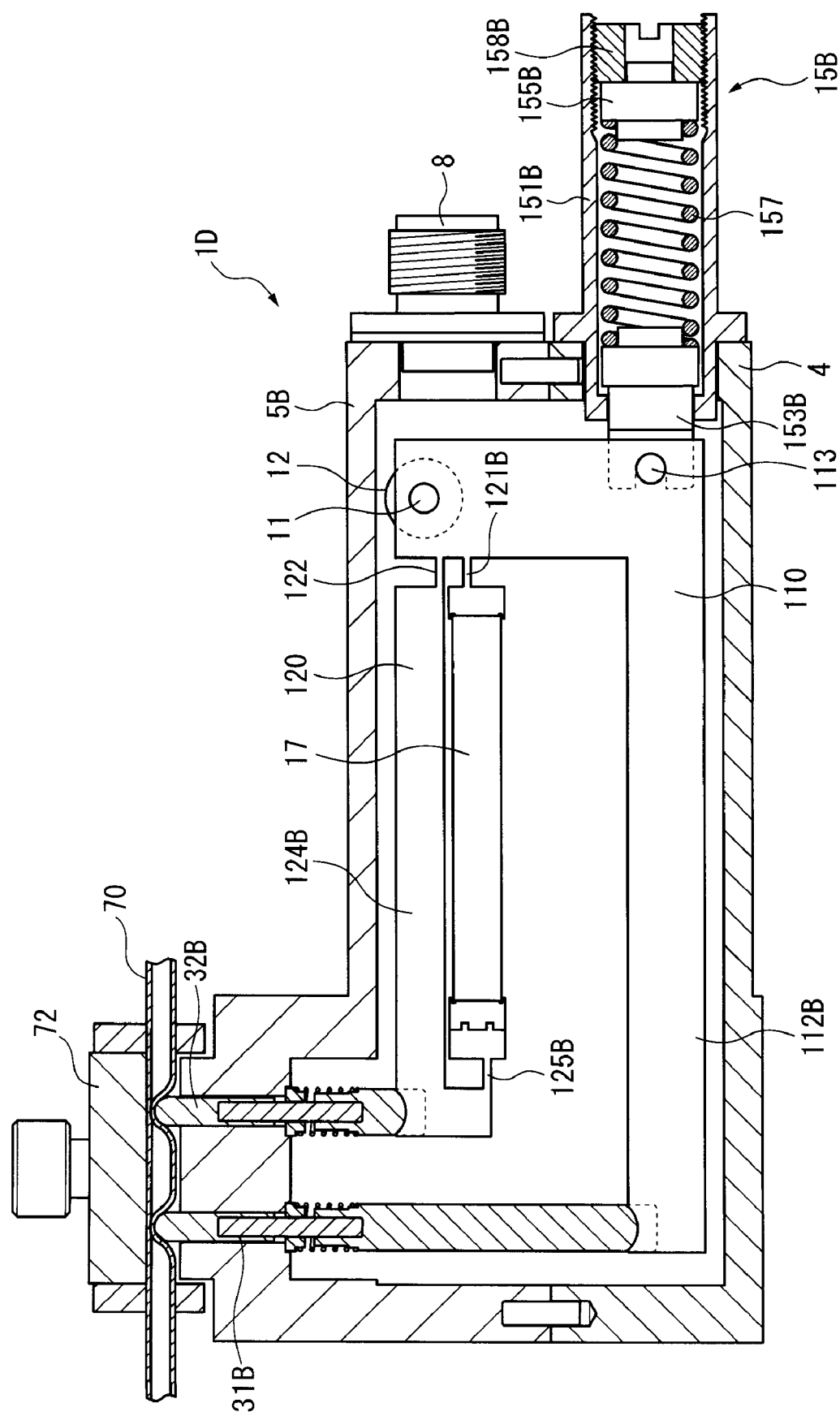
FIG. 21 is a vertical cross-sectional view showing a second modification according to the present invention.

In addition, the liquid discharging device 1B according to the second embodiment uses the two piezoelectric elements 17, 18 to move the three pressing members 31B to 33B. However, when a tube is employed, the liquid discharging device 1B can discharge the liquid without the third pressing member 33B. Specifically, as shown in FIG. 21, a liquid discharging device 1D can dispense with the second piezoelectric element 18 and the second displacement expanding portion 130. The liquid discharging device 1D is arranged such that one piezoelectric element 17, one displacement expanding portion 120 and the body 110 drive the two pressing members 31B, 32B.

Accordingly, in the liquid discharging device 1D, when either of the first pressing member 31B or the second pressing member 32B is employed as the outlet valve of the liquid discharging device 1D while the other as the inlet valve of the liquid discharging device 1D, the liquid discharging operation can be realized by pumping the liquid into the tube 70 and switching the opening and closing of the respective valves.

For instance, when the first pressing member 31B is employed as the outlet valve while the second pressing member 32B as the inlet valve, in a state where no voltage is applied to the piezoelectric element 17, the first pressing member 31B is clamped against the tube due to the biasing force of the biasing unit 15B, so that the outlet valve is maintained in the closed state. On the other hand, the second pressing member 32B maintains the inlet valve in the opened state. When the liquid is pumped into the tube 70 in this state, the outlet valve becomes swollen at an upstream side (inlet valve side) due to the closure of the outlet valve, so that the liquid is pooled therein. Then, when the voltage is applied to the piezoelectric element 17 for the expansion, such that the second pressing member 32B is moved and clamped against the tube 70 for the closure of the inlet valve, the liquid is then enclosed inside the swelling portion of the tube 70 between the inlet and outlet valves. Further, when the further voltage is applied so that the piezoelectric element 17 is expanded, since the second pressing member 32B clamped against the tube is not movable any further, the body 110 and the first pressing member 31B are moved against the biasing force of the biasing unit 15B in the direction opposite to the biasing direction. The outlet valve that has been closed by the first pressing member 31B then opens. At this moment, the tube 70 swollen by the liquid is restored to the original state by its elastic force and the liquid inside is discharged from the discharge valve.

Next, when the application of the voltage to the piezoelectric element 17 is suspended so that the piezoelectric element 17 is contracted to the original state, the first pressing member 31B is clamped against the tube 70 due to the biasing force of the biasing unit 15B and the outlet valve is closed. Then, the second pressing member 32B returns to the original position, thereby releasing the tube 70 and opening the inlet valve. Thus, the liquid discharging device 1D using the two pressing members 31B, 32B can realize the liquid discharging operation.

Further, the shapes or configurations of the displacement expanding plate, biasing unit, pressing members and channel block of the liquid discharging devices 1, 1B, 1C, 1D exemplified as a diaphragm pump or tube pump are not limited to those as described in the above embodiments, and may be appropriately modified when embodied.

In the above embodiments, the first pressing member 31, 31B biased by the biasing unit 15, 15B opens and closes the outlet valve while the second pressing member 32, 32B moved by the piezoelectric element 17 opens and closes the inlet valve. However, the liquid discharging device can be oppositely arranged such that the first pressing member 31, 31B opens and closes the inlet valve while the second pressing member 32, 32B opens and closes the outlet valve.

Figure 22:
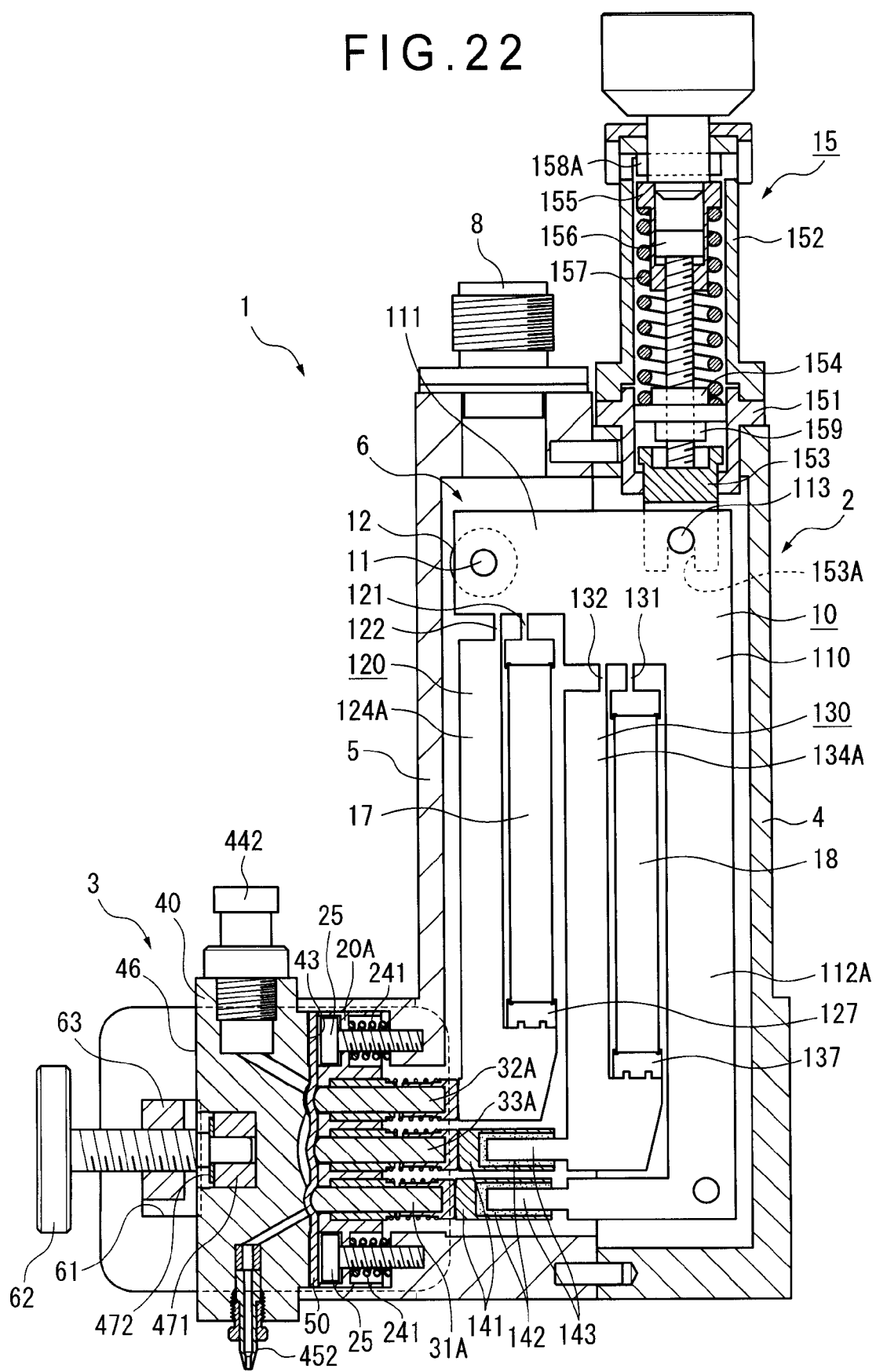
FIG. 22 is a vertical cross-sectional view showing a third modification according to the present invention.

In the above embodiments, the third hinges 125, 135 and the piezoelectric-element-second-end mounting portions 126, 136 are provided to the displacement portions 124, 134, and the piezoelectric elements 17, 18 are mounted to the mounting portions 123, 126 via the spacers 127, 137. In contrast, as shown in FIG. 22, instead of providing the third hinges 125, 135, the piezoelectric elements 17, 18 may be mounted to the displacement portions 124, 134 via the spacer 127, 137. Also in this arrangement, since the first hinges 121, 131 and the second hinges 122, 132 are formed, the hinges 121, 122, 131, 132 are elastically deformed when the piezoelectric elements 17, 18 are extended. The displacement portions 124, 134 and the piezoelectric elements 17, 18 are inclined, such that the pressing members 31 to 33 are moved toward the diaphragm 50 side.

Also as shown in FIG. 22, a coil spring 241 is provided between the pump case 5 and the guide block 20, and a biasing force of the coil spring 241 may be applied to the diaphragm 50 so that the diaphragm 50 closely fits to the concave formation surface 43. In this case, using the biasing force of the coil spring 241, the fitting force of the diaphragm 50 to the concave formation surface 43 can be easily set. Even when the thickness dimension of the diaphragm 50 varies, the coil spring 241 can absorb the variation, so that the diaphragm 50 can be reliably made to closely fit to the concave formation surface 43.

In the above-described embodiments, the pressurizing rods 311, 321, 331 each have a different length. However, as shown in FIG. 22, the pressurizing rods of the same length may be used. In this case, the size and configuration of the first to third pressing members 31, 32, 33 can be uniformed, thereby reducing a variety of parts.

Further, in the above-described embodiments, the pressing members 31, 32 directly abut on the arm 112 and the displacement portion 134 respectively, but the arrangement is not limited thereto. As shown in FIG. 22, for instance, cap members 141 may be mounted on the arm 112 and the displacement portion 134, and the pressing members 31, 32 may directly abut on the cap members 141. Specifically, the cap members 141 are cylinder members of which first ends are open while second ends are closed. After the inside of the cap member 141 is filled with an adhesive 142, an insertion portion 143 provided to the arm 112 and the displacement portion 134 is inserted into the cap member 141, and the position of the cap member 141 is adjusted. In FIG. 22, positions of the cap members 141 are adjusted and fixed by the adhesive 142 such that surfaces of the displacement portion 124 and the cap members 141 on which the pressing members 31, 32, 33 abut are aligned. With this arrangement, even when the dimensional accuracy of the arm 112 of the displacement expanding plate 10 and the displacement portions 124, 134 is not high, the mounting portions of the cap members 141 may be adjusted such that the pressing members 31, 32, 33 will not abut on the displacement portion 124 and the cap members 141 in a misaligned manner.

In the above embodiments, the piezoelectric elements 17 and 18 are controlled based on the value of the applied voltage. However, the piezoelectric elements may be feedback-controlled based on a detection value obtained by detecting the driving state using, for example, a strain gauge provided on the strained portion of the displacement expanding plate 10, 10B or a sensor detecting the positions of the pressing members.

In addition, the liquid discharging device according to the present invention may be installed in a manufacturing apparatus of electronic parts in use. Specifically, the manufacturing apparatus of the electronic parts may include the above-described liquid discharging device, a liquid supplier supplying liquid to the liquid discharging device, and a control device controlling the driving units of the liquid discharging device. With this arrangement, the liquid supplied by the liquid supplier may be discharged from the nozzle 452 via the liquid discharging device and the manufacturing apparatus may manufacture the electronic parts The manufacturing apparatus of the electronic parts uses the above-described liquid discharging device that can accurately convey liquid of infinitesimal amount. Therefore, the liquid of infinitesimal amount can be discharged from the nozzle 452 with a high accuracy.

The piezoelectric drive device according to the present invention may be utilized as not only a driving source for the liquid discharging device but also a driving source for various machines. Specifically, the piezoelectric drive device can be widely utilized as a driving source to drive a plurality of driven objects. Particularly, one driven object is moved due to the biasing force of the biasing unit and moved in a direction opposite to the biasing direction due to a reaction force produced when the other driven object is moved in accordance with the expansion of the piezoelectric element to abut on an object. Thus, the piezoelectric drive device is specifically advantageous when used as a driving source that alternately drives each of the driven objects. In addition, the piezoelectric drive device using the piezoelectric elements can secure a displacement amount to a certain degree using a displacement expanding mechanism. Thus, the piezoelectric drive device is suitable as a driving source for a compact instrument.

The priority application Number JP 2006-206711 upon which this patent application is based is hereby incorporated by reference.

What is claimed is:

1. A piezoelectric drive device, comprising:

a case; and a drive unit body movable relative to the case, wherein the drive unit body includes: a displacement expanding plate; a biasing unit; and a piezoelectric element attached to the displacement expanding plate, the displacement expanding plate includes: a body adapted to rotate or slide relative to the case, the body biased by the biasing unit; and a displacement expanding portion expanding a displacement when the piezoelectric element is expanded due to a voltage application, the displacement expanding portion being displaced relative to the body in a direction perpendicular to an expanding direction of the piezoelectric element, in a state where no voltage is applied to the piezoelectric element, a first driven object is moved by the body that is biased by the biasing unit, when the voltage is applied to the piezoelectric element, a second driven object is moved by the displacement expanding portion, and when the voltage is further applied to the piezoelectric element in a state where the second driven object abuts on an object such that the displacement of the displacement expanding portion is expanded, the body and the first driven object are moved against a biasing force of the biasing unit in a direction opposite to a biasing direction of the biasing unit.

2. The piezoelectric drive device according to claim 1, wherein the piezoelectric element includes a first piezoelectric element and a second piezoelectric element, the displacement expanding plate includes: a first displacement expanding portion being displaced relative to the body in a direction perpendicular to an expanding direction of the first piezoelectric element in accordance with the expansion of the first piezoelectric element; and a second displacement expanding portion being displaced relative to the body in a direction perpendicular to an expanding direction of the second piezoelectric element in accordance with the expansion of the second piezoelectric element, the body moves a first driven object, the first displacement expanding portion moves a second driven object, and the second displacement expanding portion moves a third driven object.

3. The piezoelectric drive device according to claim 1, wherein the body having a base end portion and an arm extended from the base end portion is substantially L-shaped in plane view, the displacement expanding plate includes: a first hinge and a second hinge continuously formed from the base end portion of the body, the first and second hinges being arranged to be parallel with each other; a piezoelectric-element-first-end mounting portion continuously formed from the first hinge, the piezoelectric-elementfirst-end mounting portion being mounted with a first end of the piezoelectric element; a displacement portion continuously formed form the second hinge, the displacement portion extending along a longitudinal direction of the piezoelectric element to a second end side of the piezoelectric element; a third hinge formed from the displacement portion toward the second end of the piezoelectric element; and a piezoelectric-element-second-end mounting portion continuously formed from the third hinge, the piezoelectric-element-second-end mounting portion being mounted with the second end of the piezoelectric element, and the arm, the piezoelectric element and the displacement portion are arranged to be substantially parallel with one another.

4. The piezoelectric drive device according to claim 2, wherein the body having a base end portion and an arm extended from the base end portion is substantially L-shaped in plane view, the first and second displacement expanding plates include: a first hinge and a second hinge continuously formed from the base end portion of the body, the first and second hinges being arranged to be parallel with each other; a piezoelectric-element-first-end mounting portion continuously formed from the first hinge, the piezoelectric-element-first-end mounting portion being mounted with a first end of the piezoelectric element; a displacement portion continuously formed form the second hinge, the displacement portion extending along a longitudinal direction of the piezoelectric element to a second end side of the piezoelectric element; a third hinge formed from the displacement portion toward the second end of the piezoelectric element; and a piezoelectric-element-second-end mounting portion continuously formed from the third hinge, the piezoelectric-element-second-end mounting portion being mounted with the second end of the piezoelectric element, and the arm, the piezoelectric element and the displacement portion are arranged to be substantially parallel with one another.

5. The piezoelectric drive device according to claim 1, wherein the body having a base end portion and an arm extended from the base end portion is substantially L-shaped in plane view, the displacement expanding plate includes: a first hinge and a second hinge continuously formed from the base end portion of the body, the first and second hinges being arranged to be parallel with each other; a piezoelectric-element-first-end mounting portion continuously formed from the first hinge, the piezoelectric-element-first-end mounting portion being mounted with a first end of the piezoelectric element; and a displacement portion continuously formed from the second hinge, the displacement portion extending along a longitudinal direction of the piezoelectric element to a second end side of the piezoelectric element, the second end of the piezoelectric element being attached to the displacement portion, and the arm, the piezoelectric element and the displacement portion are arranged to be substantially parallel with one another.

6. The piezoelectric drive device according to claim 2, wherein the body having a base end portion and an arm extended from the base end portion is substantially L-shaped in plane view, the first and second displacement expanding plates include: a first hinge and a second hinge continuously formed from the base end portion of the body, the first and second hinges being arranged to be parallel with each other; a piezoelectric-element-first-end mounting portion continuously formed from the first hinge, the piezoelectric-element-first-end mounting portion being mounted with a first end of the piezoelectric element; and a displacement portion continuously formed from the second hinge, the displacement portion extending along a longitudinal direction of the piezoelectric element to a second end side of the piezoelectric element, the second end of the piezoelectric element being attached to the displacement portion, and the arm, the piezoelectric element and the displacement portion are arranged to be substantially parallel with one another.

* * * * *